US012317071B2

(12) United States Patent
Sugawara

(10) Patent No.: US 12,317,071 B2
(45) Date of Patent: May 27, 2025

(54) COMMUNICATION APPARATUS

(71) Applicant: CANON KABUSHIKI KAISHA, Tokyo (JP)

(72) Inventor: Wahei Sugawara, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 305 days.

(21) Appl. No.: 17/897,264

(22) Filed: Aug. 29, 2022

(65) Prior Publication Data
US 2023/0067941 A1 Mar. 2, 2023

(30) Foreign Application Priority Data

Aug. 31, 2021 (JP) ................. 2021-141651

(51) Int. Cl.
*H04W 12/06* (2021.01)
*H04W 12/08* (2021.01)
*H04W 60/00* (2009.01)

(52) U.S. Cl.
CPC .......... *H04W 12/06* (2013.01); *H04W 12/08* (2013.01); *H04W 60/00* (2013.01)

(58) Field of Classification Search
None
See application file for complete search history.

(56) References Cited

U.S. PATENT DOCUMENTS

| | | | | |
|---|---|---|---|---|
| 5,768,531 A * | 6/1998 | Lin | ........................ | H04W 76/10 370/328 |
| 7,539,175 B2 * | 5/2009 | White | .................... | H04W 76/15 455/442 |
| 8,165,044 B2 * | 4/2012 | Mahajan | ................. | H04L 12/66 370/278 |
| 8,797,855 B1 * | 8/2014 | Wieland | ................... | H04W 4/60 370/395.2 |
| 8,891,771 B2 * | 11/2014 | Sakai | ................ | H04W 12/0433 380/278 |
| 9,629,077 B2 * | 4/2017 | Sumiuchi | .............. | H04W 48/20 |
| 9,832,722 B2 * | 11/2017 | Sumiuchi | .............. | H04W 48/20 |
| 10,264,522 B2 * | 4/2019 | Sumiuchi | .............. | H04W 48/20 |
| 10,264,523 B2 * | 4/2019 | Sumiuchi | .............. | H04W 48/16 |
| 11,429,332 B2 * | 8/2022 | Sugawara | ............ | G06F 3/1286 |

(Continued)

FOREIGN PATENT DOCUMENTS

JP 2016-127545 A 7/2016

*Primary Examiner* — Kaveh Abrishamkar
(74) *Attorney, Agent, or Firm* — Venable LLP

(57) ABSTRACT

A communication apparatus for performing communication in a first mode of wirelessly communicating with a terminal apparatus via an external wireless base station or in a second mode without intervention of the external wireless base station, comprising communication means for executing a first authentication method used in communication in the first mode, and a second authentication method used in communication in the first mode and using an authentication server, and control means, wherein, in the first mode, if an authentication method in the first mode is the second authentication method, the control means controls the communication means to be able to use the first mode, and if an authentication method in the first mode is the first authentication method, the control means controls the communication means to be able to use both the first and the second modes.

20 Claims, 23 Drawing Sheets

(56) References Cited

U.S. PATENT DOCUMENTS

| | | | | |
|---|---|---|---|---|
| 2011/0170686 | A1* | 7/2011 | Goto | H04L 9/0844 |
| | | | | 380/44 |
| 2011/0188658 | A1* | 8/2011 | Sakai | H04W 12/0433 |
| | | | | 380/278 |
| 2011/0191473 | A1* | 8/2011 | Sakai | H04W 8/005 |
| | | | | 709/224 |
| 2016/0198403 | A1* | 7/2016 | Sumiuchi | H04W 48/20 |
| | | | | 455/434 |
| 2017/0181078 | A1* | 6/2017 | Sumiuchi | H04W 48/16 |
| 2018/0049117 | A1* | 2/2018 | Sumiuchi | H04W 48/16 |
| 2018/0227845 | A1* | 8/2018 | Sumiuchi | H04W 48/16 |

* cited by examiner

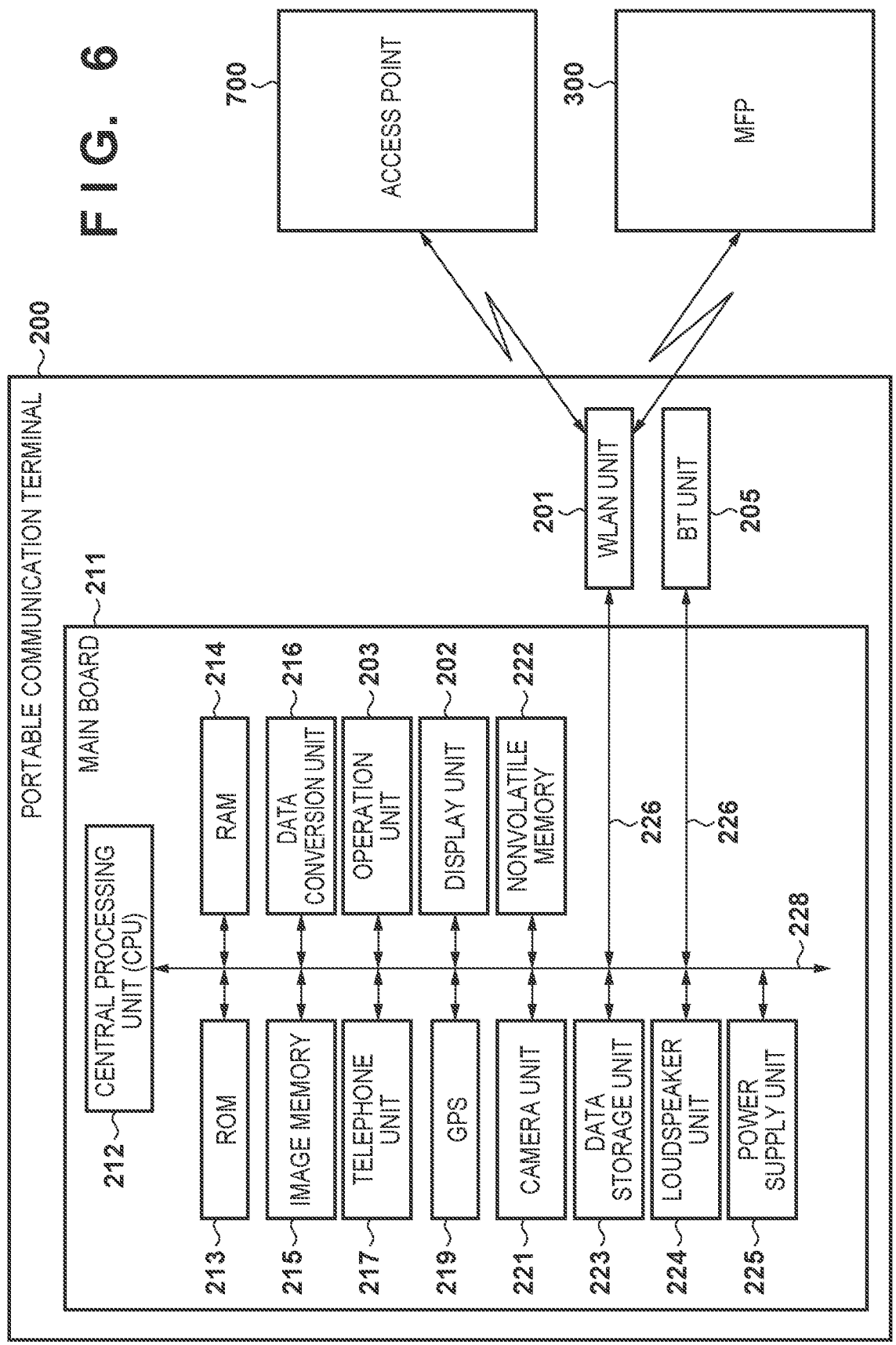

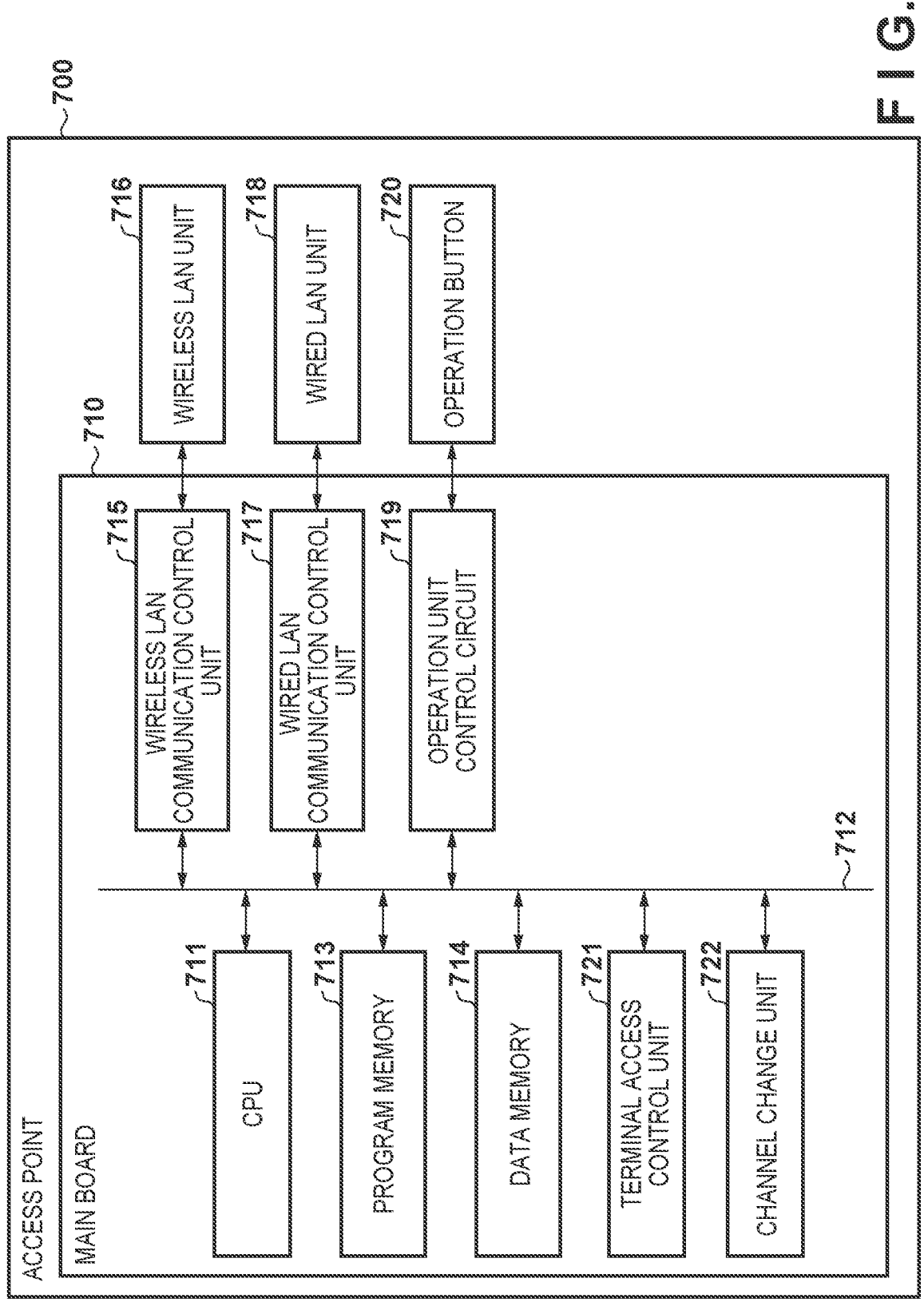

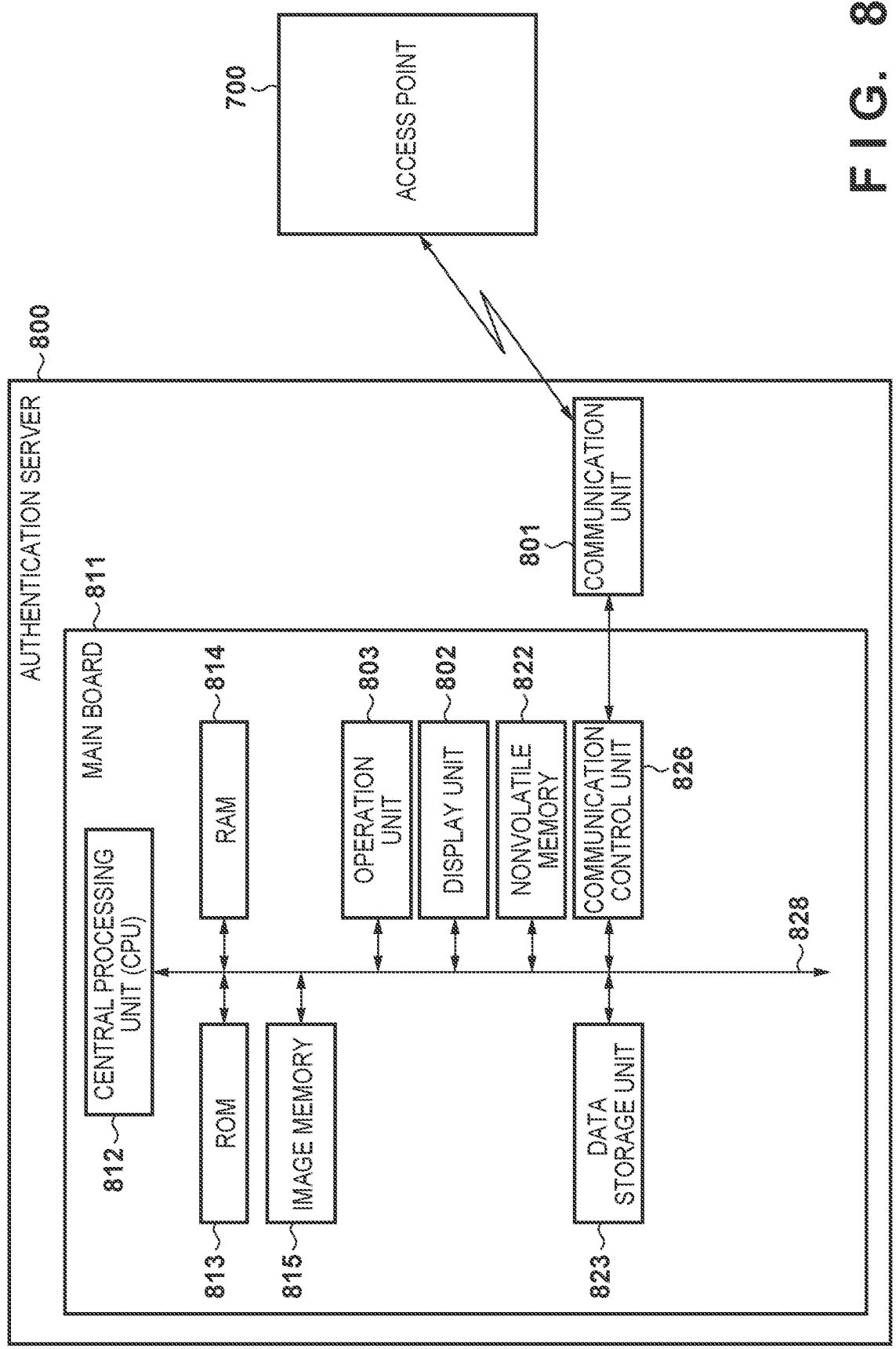

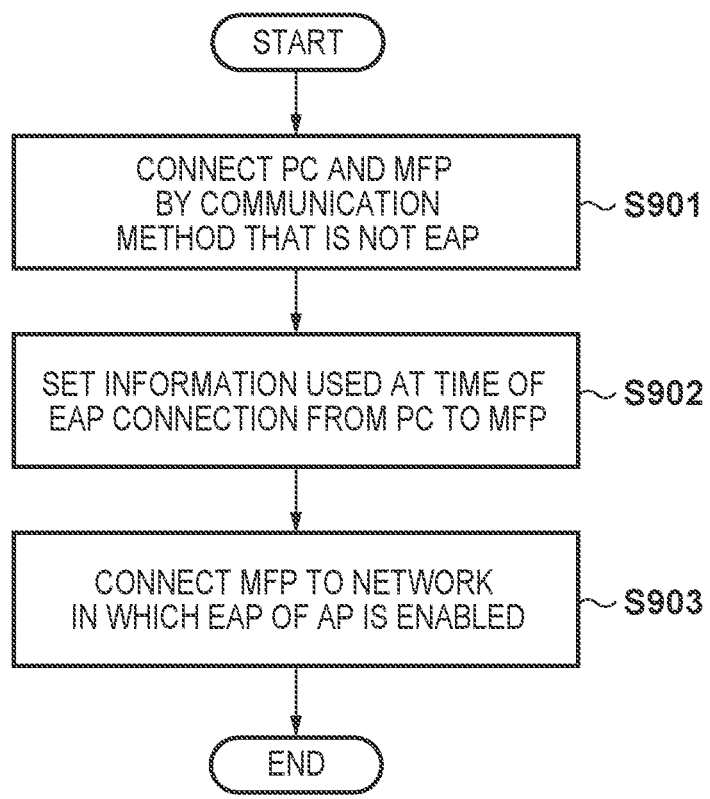

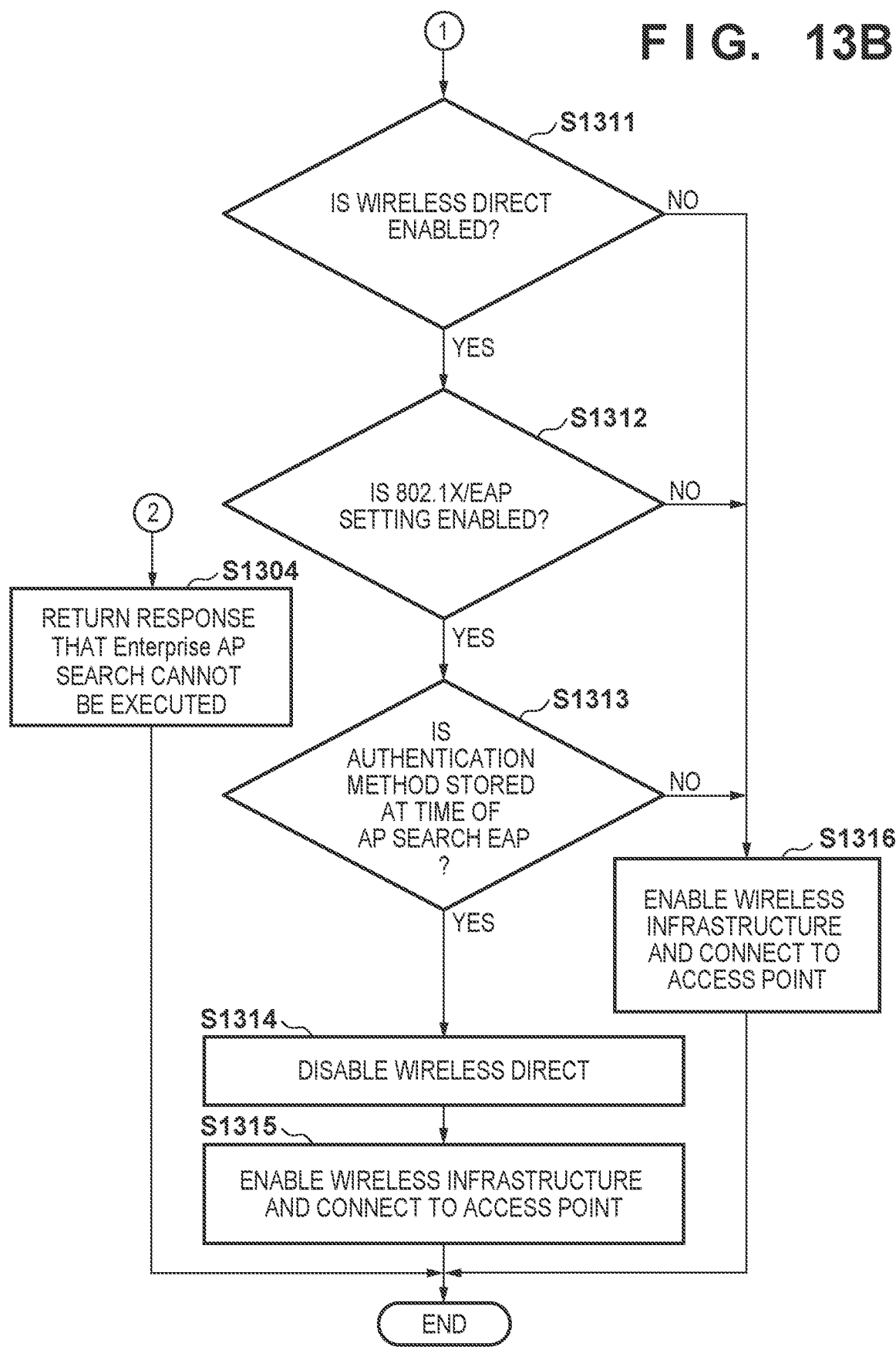

COMMUNICATION APPARATUS

BACKGROUND OF THE INVENTION

Field of the Invention

The present invention mainly relates to a communication apparatus.

Description of the Related Art

Some of communication apparatuses that execute processing for connecting to a peripheral access point execute connection by selecting an access point based on an SSID (Service Set Identifier) list (see Japanese Patent Laid-Open No. 2016-127545). The SSID list is acquired by searching for connectable access points.

In a communication method using a wireless LAN complying with a predetermined standard, a network can be protected by authenticating a communication apparatus to be connected to the network. A typical example of the standard is the IEEE (Institute of Electrical and Electronics Engineers) 802.11 standard. Examples of an authentication method are a PSK (Pre Shared Key) method using a PSK, and an SAE (Simultaneous Authentication of Equals) method using an SAE. Another example is an EAP method of authenticating a communication apparatus to be connected to a network using an authentication server complying with IEEE802.1X/EAP (Extensible Authentication Protocol).

As an apparatus that executes processing for connecting to a wireless LAN using the IEEE802.1X/EAP authentication method becomes more widespread, it can be required to improve convenience of a communication apparatus that executes processing for connecting to a wireless LAN using the IEEE802.1X/EAP authentication method. For example, if an MFP (Multi Function Printer) is connected to a wireless LAN using the IEEE802.1X/EAP authentication method, the following operations need to be executed.

First, the MFP and an information processing apparatus are connected to each other using a communication interface not using the IEEE802.1X/EAP authentication method.

Next, the information processing apparatus sets, in the MFP, setting values to be used by the IEEE802.1X/EAP authentication method.

After that, the MFP searches for access points, and selects the SSID of an access point supporting the IEEE802.1X/EAP authentication method.

If connection to the wireless LAN by the IEEE802.1X/EAP authentication method fails, it is e necessary to switch the communication interface to a communication interface not using the IEEE802.1X/EAP authentication method, and set again setting values to be used by the IEEE802.1X/EAP authentication method. If the printer and the access point are connected by the IEEE802.1X/EAP authentication method, it can be necessary to prevent printing by an unauthenticated terminal via Wireless Direct. Therefore, an arrangement in which a communication interface using the IEEE802.1X/EAP authentication method and a communication interface not using the IEEE802.1X/EAP authentication method can relatively easily be switched (by, for example, a small number of user operations intuitionally) can be required.

SUMMARY OF THE INVENTION

The present invention provides a technique advantageous in improving convenience of a communication apparatus that can execute connection to an access point operating by an authentication method using an authentication server.

One of the aspects of the present invention provides a communication apparatus capable of performing communication in a plurality of communication modes including a first communication mode of wirelessly communicating with a terminal apparatus via an external wireless base station and a second communication mode of wirelessly communicating with the terminal apparatus without intervention of the external wireless base station, comprising a communication unit configured to execute a first authentication method used in communication in the first communication mode, and a second authentication method different from the first authentication method, used in communication in the first communication mode, and using an authentication server, and a control unit configured to control the communication unit, wherein when executing connection to a wireless base station in the first communication mode, if it is determined that an authentication method in the first communication mode is the second authentication method, the control unit controls the communication unit to be able to use the first communication mode out of the first communication mode and the second communication mode, and if it is determined that the authentication method in the first communication mode is the first authentication method, the control unit controls the communication unit to be able to use both the first communication mode and the second communication mode.

Further features of the present invention will become apparent from the following description of exemplary embodiments (with reference to the attached drawings).

BRIEF DESCRIPTION OF THE DRAWINGS

FIG. 6 is a block diagram showing an example of the arrangement of the information processing apparatus;

FIG. 7 is a block diagram showing an example of the arrangement of an access point;

FIG. 8 is a block diagram showing an example of the arrangement of an authentication server;

FIG. 9 is a flowchart illustrating an example of a procedure of connecting the MFP to a network operating by an authentication method using the authentication server;

FIGS. 13A and 13B are flowcharts for explaining processing of connecting the MFP to the network operating by the authentication method using the authentication server;

DESCRIPTION OF THE EMBODIMENTS

Figure 1:
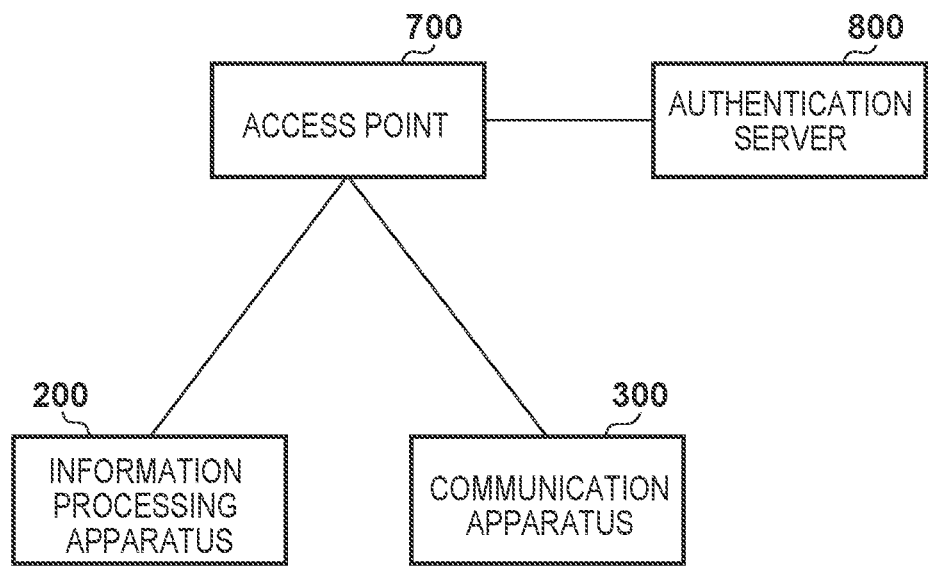
FIG. 1 is a block diagram showing an example of a system configuration.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

(System Configuration)

FIG. 1 shows an example of the configuration of a communication system according to this embodiment. As one example, this system is configured so that a plurality of communication apparatuses can wirelessly communicate with each other. In this example, as the plurality of communication apparatuses, an information processing apparatus 200, an MFP (Multi Function Printer) 300, an access point 700, and an authentication server 800 are used.

Note that the information processing apparatus 200 and the MFP 300 can simply be represented as communication apparatuses unless they are particularly discriminated. For example, the MFP 300 may be represented as the communication apparatus 300.

The information processing apparatus 200 is an information processing apparatus having a function of communicating by a wireless LAN, a wired LAN, or the like. The wireless LAN can be represented as a WLAN (Wireless LAN). Examples of the information processing apparatus 200 are a smartphone, a notebook PC (notebook personal computer (multi function peripheral)), a tablet terminal, and a PDA (Personal Digital Assistant).

The MFP 300 is a printing apparatus having a printing function as a main function, and can also have sub-functions such as a reading function (scan function), a FAX (facsimile) function, and a telephone function. The MFP 300 has a communication function that enables wireless communication with the information processing apparatus 200. In this embodiment, as one example, a case in which the MFP 300 is used will be described but the present invention is not limited to this. For example, instead of the MFP 300, a facsimile, a scanner, a projector, a portable terminal, a smartphone, a notebook PC, a tablet terminal, a PDA, or the like may be used. Alternatively, a digital camera, a music reproduction device, a television, a smart speaker, AR (Augmented Reality) glasses, or the like may be used.

The access point (AP) 700 is provided separately from (outside) the information processing apparatus 200 and the MFP 300, and operates as a base station apparatus or wireless base station of a WLAN. A communication apparatus having a WLAN communication function can perform communication in a WLAN infrastructure mode (wireless infrastructure mode) via the access point 700. The access point 700 wirelessly communicates with a communication apparatus (that is, an authenticated communication apparatus) that is permitted to connect with the access point 700 itself, and relays wireless communication between the communication apparatus and another communication apparatus. The access point 700 can be connected to, for example, a wired communication network to relay communication between a communication apparatus connected to the wired communication network and another communication apparatus wirelessly connected to the access point 700.

If the authentication method of a network created by the access point 700 is a method using the authentication server 800, the access point 700 performs access control by authenticating, in cooperation with the authentication server 800, a communication apparatus to be connected to the network. A communication apparatus to be connected to the network created by the access point 700 can be restricted in terms of communication with an apparatus other than the authentication server 800 until it is authenticated.

The authentication server (Radius server) 800 is provided separately from the information processing apparatus 200, the MFP 300, and the access point 700, and comprehensively manages authentication information. The authentication server 800 can execute authentication processing complying with, for example, the IEEE802.1X standard. In this embodiment, the authentication server 800 authenticates, in cooperation with the access point 700, a terminal to be authenticated, and performs access control of the terminal based on an authentication result.

The access point 700 corresponds to an authenticator in IEEE802.1X. Furthermore, the information processing apparatus 200 and the MFP 300 correspond to supplicants in IEEE802.1X.

The authentication server 800 performs authentication by, for example, the EAP-TLS (Transport Layer Security) method or EAP-TTLS (Tunneled TLS) method in the IEEE802.1X standard. The EAP-TLS method is an authentication method using the TLS handshake protocol, and can perform authentication using a server certificate, a client certificate, and the like. The EAP-TTLS method is an authentication method using the TLS handshake protocol, and can perform authentication using a server certificate, a user name, a password, and the like. As another example, the authentication server 800 can perform authentication by the PEAP (Protected EAP) method in the IEEE802.1X standard. In the PEAP (Protected EAP) method, it is possible to perform authentication using a user name and a password. The information used for authentication in IEEE802.1X can be expressed as "authentication information".

The information processing apparatus 200 and the MFP 300 can perform wireless communication in a peer-to-peer (P2P) mode without intervention of the external access point 700 or in the wireless infrastructure mode via the external access point 700 using their WLAN communication functions. The P2P mode includes a WFD (Wi-Fi Direct®) mode and a software AP mode. That is, the above communication is implemented by Wireless Direct complying with the IEEE802.11 series. Note that the information processing apparatus 200 and the MFP 300 can execute processing corresponding to a plurality of print services using WLAN communication, as will be described in detail later.

(Outer Appearance of MFP)

Figure 2:
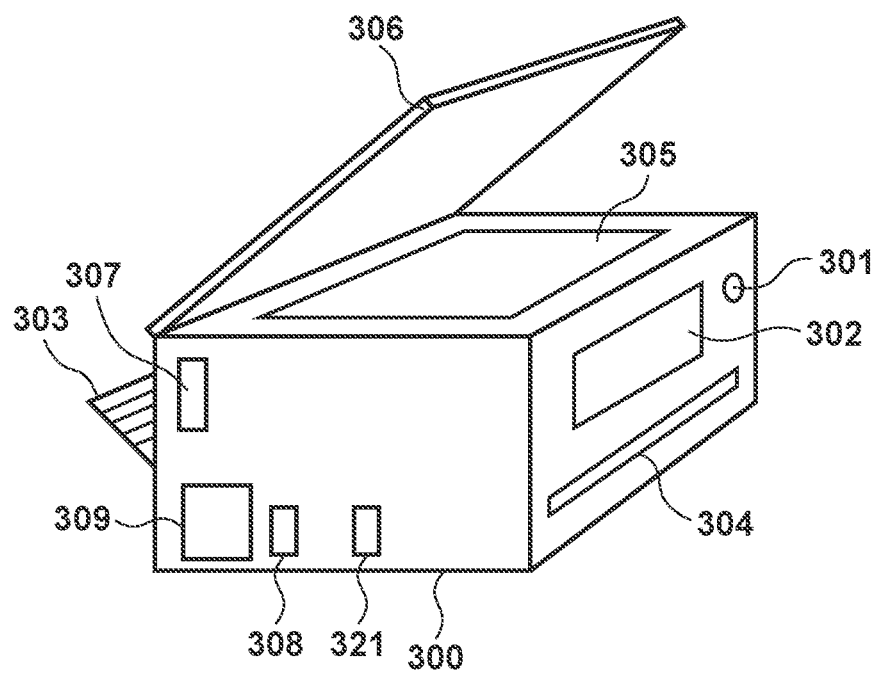
FIG. 2 is a view showing an example of the outer appearance of an MFP.

FIG. 2 is a perspective view showing an example of the outer appearance of the MFP 300. The MFP 300 includes an operation display unit (operation panel) 302, a print sheet insertion port 303, a print sheet discharge port 304, a document table 305, and a document cover 306. In the housing of the MFP 300, a hard key used to turn on and off the power is provided as a power button 301. The operation display unit 302 includes a display and buttons used to operate the MFP 300. For example, the operation display unit 302 includes a plurality of keys such as character input keys, cursor keys, an enter key, and a cancel key and a light source such as an LED (Light Emitting Diode) or an LCD (Liquid Crystal Display). The operation display unit 302 is configured to accept a user operation input when activating each function of the MFP 300 or changing various settings. A touch panel display can typically be used as the operation display unit 302 (see FIG. 4).

The print sheet insertion port 303 is an insertion port for setting sheets of an arbitrary size. Sheets set at the print sheet insertion port 303 are conveyed one by one to a printing unit, undergo printing, and are discharged from the print sheet discharge port 304. The document table 305 is a transparent glass table and is used to set a document and read an image using the scan function. The document cover 306 is a cover for pressing a document against the document table so as not to float from the document table 305 when reading an image using the scan function, and can prevent external light from entering the main body of the MFP 300.

The MFP 300 has a function of communicating by the WLAN or wired LAN. In this embodiment, the MFP 300 incorporates an antenna for implementing wireless communication, and is provided with a communication unit 321 for the wired LAN. The MFP 300 is provided with a USB communication unit 309 that can implement communication with the external information processing apparatus 200 or the like by USB connection.

(Arrangement of MFP)

Figure 3:
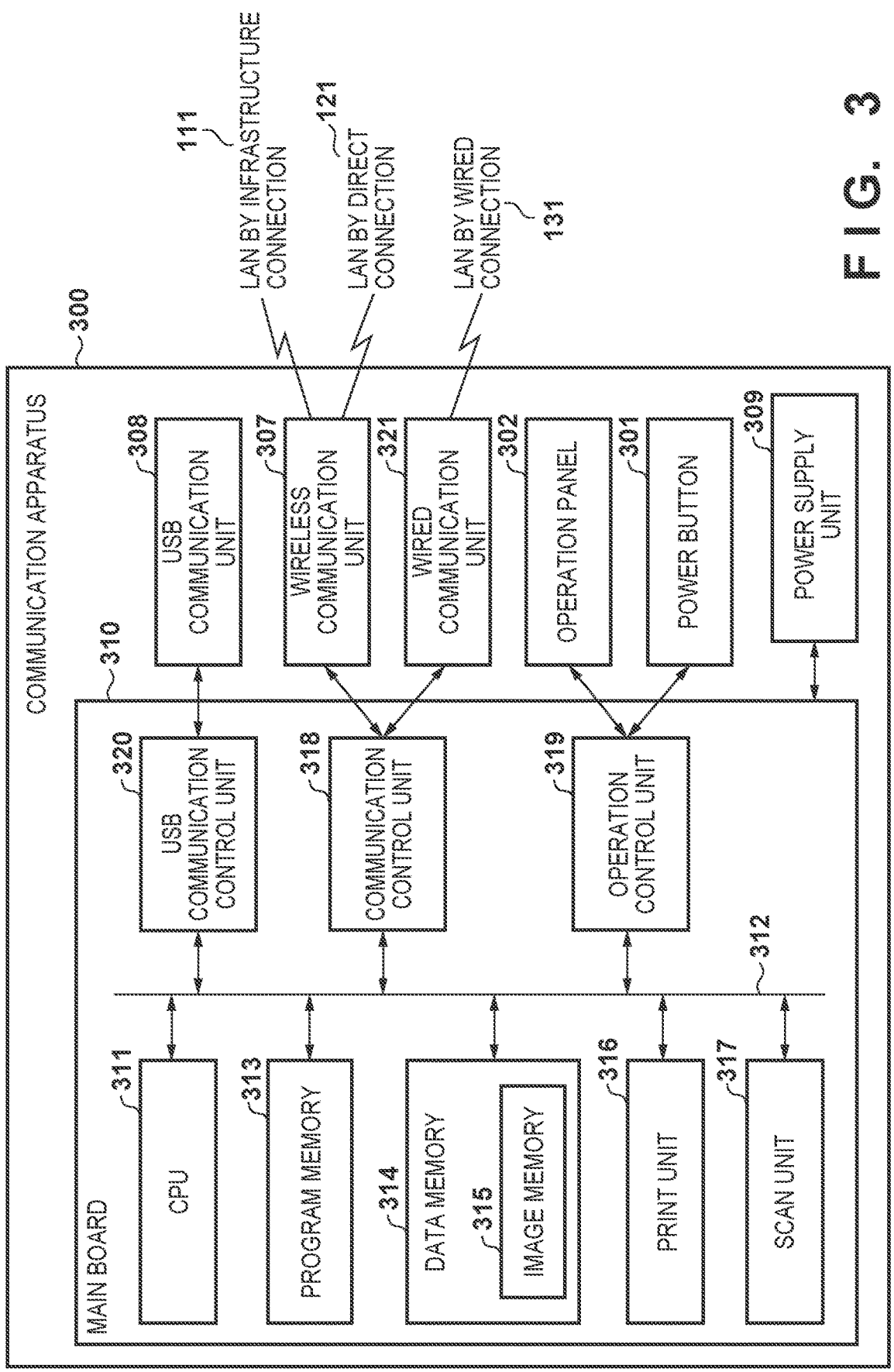
FIG. 3 is a block diagram showing an example of the arrangement of the MFP.

FIG. 3 is a block diagram showing an example of the arrangement of the MFP 300. The MFP 300 incorporates a main board 310 that controls the overall apparatus, and further includes a wireless communication unit 307 and a USB communication unit 308. The main board 310 includes a CPU (Central Processing Unit) 311, an internal bus 312, a program memory 313, a data memory 314, a print unit 316, a scan unit 317, a communication control unit 318, an operation control unit 319, and a USB communication control unit 320. Note that processing to be explained below as processing executed by the MFP 300 is actually implemented when the CPU 311 executes a program stored in the program memory 313, the data memory 314, or the like.

Assume that the CPU 311, the program memory 313, and the data memory 314 are a microprocessor, a ROM (Read Only Memory), and a RAM (Random Access Memory), respectively. In this embodiment, the CPU 311, the program memory 313, and the data memory 314 are connected to each other via a bus cable forming the internal bus 312. Based on a control program stored in the program memory 313 and contents in the data memory 314, the CPU 311 performs calculation processing for implementing each function described in this embodiment.

For example, the CPU 311 can control the scan unit 317 to read a document and store its image (image data) in an image memory 315 in the data memory 314. The CPU 311 can control the print unit 316 to print, on a recording medium, an image stored in the image memory 315. The CPU 311 can control the USB communication unit 308 via the USB communication control unit 320 to perform USB communication by USB connection with the external information processing apparatus 200. The CPU 311 can control the operation control unit 319 to receive information indicated by an operation input from the operation display unit 302 or the power button 301. The CPU 311 can also control the operation control unit 319 to display the state of the MFP 300 or a function selection menu on the operation display unit 302.

The wireless communication unit 307 is configured to provide the WLAN communication function, and provides, for example, the same function as that of the WLAN unit 201 of the information processing apparatus 200. That is, the wireless communication unit 307 transmits, to another device, packets converted from data in a form complying with a predetermined standard, and also reconstructs packets from another device into original data and outputs the data to the CPU 311. The wireless communication unit 307 is configured to be capable of executing data (packet) communication in the WLAN system complying with the IEEE802.11 standard series (IEEE802.11a/b/g/n/ac/ax and the like) but a WLAN system complying with another standard is possible. In this example, assume that the wireless communication unit 307 can perform communication in both the 2.4- and 5-GHz frequency bands. As will be described in detail later, the wireless communication unit 307 can further execute WFD-based communication, communication in the software access point (software AP) mode, communication in the wireless infrastructure mode, and the like. Furthermore, the information processing apparatus 200 and the MFP 300 can perform WFD-based Wireless Direct communication, and the wireless communication unit 307 can have a software AP function or a group owner function. That is, the wireless communication unit 307 can create a P2P communication network, and decide a channel to be used for P2P communication.

The wired LAN communication unit 321 is configured to implement wired communication. For example, the wired LAN communication unit 321 can implement data (packet) communication in a wired LAN (Ethernet) system complying with the IEEE802.3 series. Furthermore, in wired communication using the wired LAN communication unit 321, it is possible to perform communication in a wired mode. In this example, the wired LAN communication unit 321 is connected to the main board 310 via the bus cable forming the internal bus 312.

(Operation Display Unit of MFP)

Figure 4A:
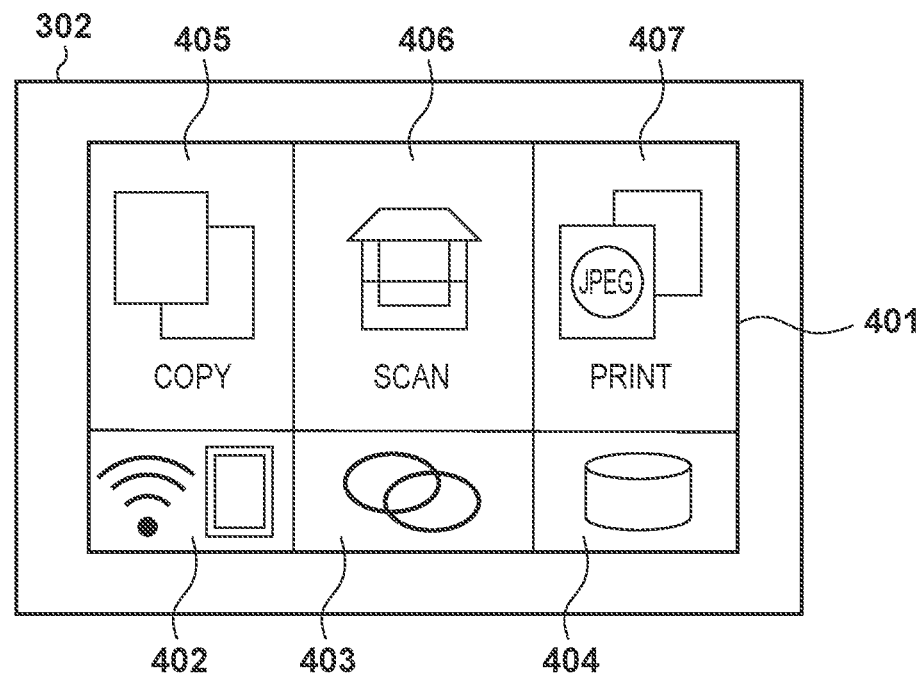
FIGS. 4A to 4C are views each showing an example of a screen displayed on the operation display unit of the MFP.
Figure 4B:
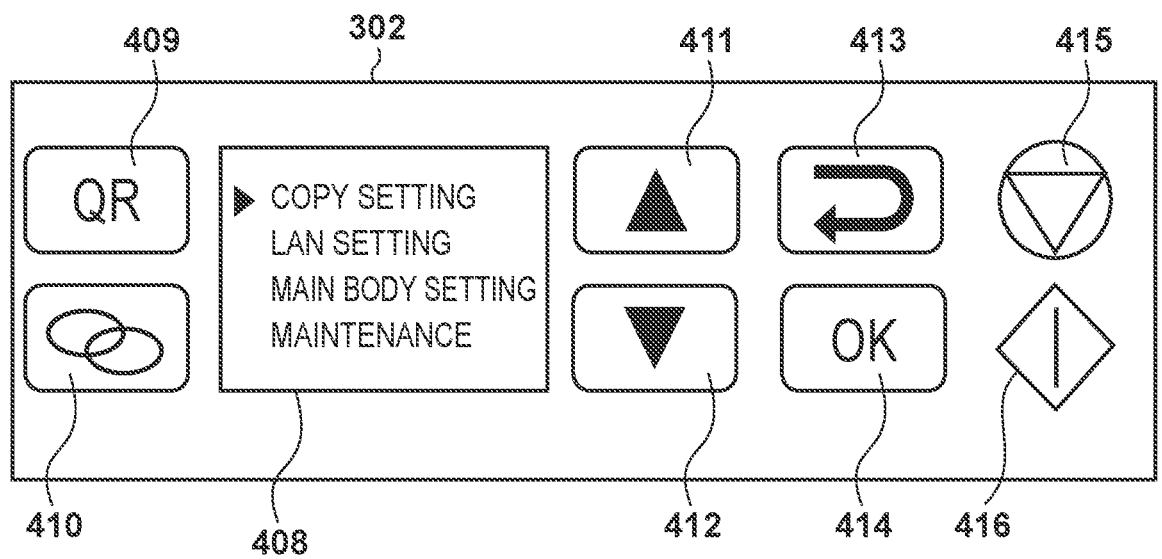
Figure 4C:
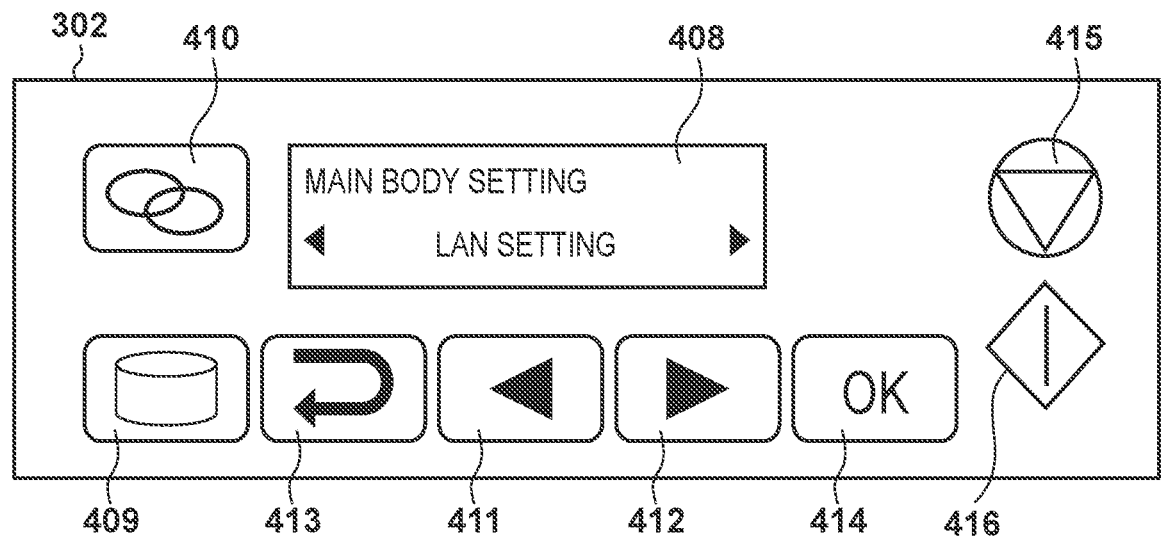

FIGS. 4A to 4C each schematically show an example of the arrangement of the operation display unit 302 of the MFP 300. FIG. 4A shows an example in a case in which a touch panel display 401 is adopted as the operation display unit 302.

The user can activate the MFP 300 by touching the power button 301. After the activation of the MFP 300, a home screen (typically, the top layer of a menu) is displayed, on the touch panel display 401, as a screen to which the user can input an operation.

The home screen includes a copy region 405, a scan region 406, and a print region 407. The copy region 405 accepts a copy processing execution instruction. The scan region 406 accepts a scan processing execution instruction. The print region 407 accepts a print processing execution instruction.

The home screen can further include a state display region 402, a connection setting mode region 403, and a setting region 404. The state display region 402 indicates the settings and connection state of infrastructure connection, direct connection, or the like of the MFP 300. With the connection setting mode region 403, the user can start an operation in the connection setting mode at an arbitrary timing. Furthermore, the user can change various settings using the setting region 404.

FIG. 4B shows an example in a case in which a relatively small LCD display 408 and various hard keys 409 to 416 are adopted as the operation display unit 302.

After the activation of the MFP 300, a home screen is displayed on the LCD display 408. The user can operate a cursor displayed on the LCD display 408 by pressing the cursor move button 411 or 412. When executing the operation, the user presses the OK button 414. When returning to an immediately preceding menu screen, the user presses the return button 413. By pressing the QR button 409, a QR Code® including information necessary for direct connection to the MFP 300 can be displayed. The code displayed here is not limited to the QR Code, and any two-dimensional code can be used. By reading this QR code from the information processing apparatus 200, the information processing apparatus 200 and the MFP 300 can directly be connected to perform wireless communication. By pressing the connection setting mode button 410, the connection setting mode can be started, and the MFP 300 can be connected to the access point 700 by transmitting connection information to the MFP 300 using the information processing apparatus 200. If the stop button 415 is pressed while the MFP 300 executes various processes, the various processes are canceled. By pressing the copy start button 416, the user can scan a document to execute printing by the MFP 300.

As shown in FIG. 4C, the layout shown in FIG. 4B may be changed appropriately. For example, a cursor operation may be performed in the left-and-right direction. Note that the above-described elements 408 to 416 may simply be referred to as screens. For example, the LCD display 408 can be referred to as the screen 408.

(Outer Appearance of Information Processing Apparatus)

Figure 5:
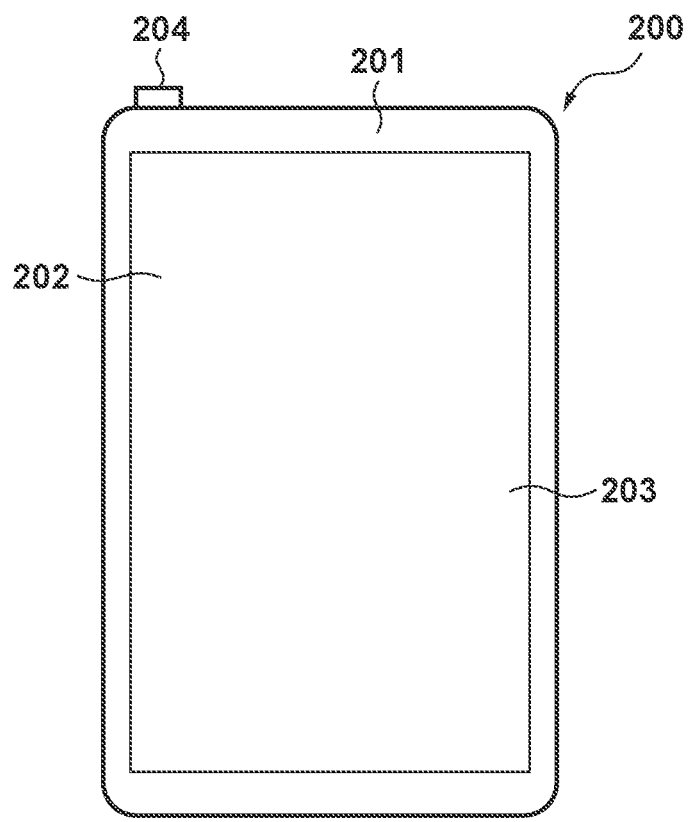
FIG. 5 is a view showing an example of the outer appearance of an information processing apparatus.

FIG. 5 shows an example of the outer appearance of the information processing apparatus 200. In this embodiment, the information processing apparatus 200 is assumed to be a smartphone, and includes a display unit 202, an operation unit 203, and a power key 204. The power key 204 is provided as a hard key used to turn on or off the power of the information processing apparatus 200. The display unit 202 is a display including an LCD type display mechanism in this embodiment but may display information using an LED or the like as another embodiment. Furthermore, the information processing apparatus 200 may have a function of outputting information by audio in addition to or instead of the display unit 202. The operation unit 203 includes hard keys such as keys and buttons or a touch panel, and can be configured to detect a user operation input.

In this embodiment, the function of the display unit 202 and that of the operation unit 203 are implemented using a touch panel display. That is, the display unit 202 and the operation unit 203 are implemented by a single device. In this case, for example, button icons and a software keyboard are displayed using the function of the display unit 202, and user operation inputs for them are detected by the function of the operation unit 203. As another embodiment, the display unit 202 and the operation unit 203 may be provided as individual hardware components.

Furthermore, the information processing apparatus 200 can incorporate a WLAN unit 201 that can provide a WLAN communication function. The WLAN unit 201 is configured to execute data (packet) communication in the WLAN system complying with, for example, the IEEE802.11 standard series (IEEE802.11a/b/g/n/ac/ax and the like). The WLAN unit 201 may be able to execute communication in a WLAN system complying with another standard. In this example, assume that the WLAN unit 201 can perform communication in both the 2.4- and 5-GHz frequency bands. As will be described in detail later, the WLAN unit 201 can execute WFD-based communication, communication in the software AP mode, communication in the wireless infrastructure mode, and the like.

(Arrangement of Information Processing Apparatus)

FIG. 6 shows an example of the arrangement of the information processing apparatus 200. The information processing apparatus 200 includes a main board 211 that performs main control of the information processing apparatus 200 itself, the WLAN unit 201 that performs WLAN communication, and a BT (Bluetooth®) unit 205.

In this embodiment, the main board 211 includes a CPU 212, a ROM 213, a RAM 214, an image memory 215, and a data conversion unit 216. The main board 211 further includes a telephone unit 217, a GPS (Global Positioning System) 219, a camera unit 221, a nonvolatile memory 222, a data storage unit 223, a loudspeaker unit 224, and a power supply unit 225. These functional units in the main board 211 are connected to each other via a system bus 228, and managed by the CPU 212. The main board 211 and the WLAN unit 201, and the main board 211 and the BT unit 205 are connected via dedicated buses 226, respectively.

The CPU 212 functions as a system control unit that controls each element of the information processing apparatus 200. The exemplified functions of the information processing apparatus 200 and other processes (to be described later) executed by the information processing apparatus 200 are implemented when the CPU 212 loads programs stored in the ROM 213 into the RAM 214 and executes them.

More specifically, the ROM 213 stores control programs to be executed by the CPU 212, an embedded operating system (OS) program, and the like. The CPU 212 executes a corresponding program under the embedded OS, thereby performing software control such as scheduling or task switching. The RAM 214 is implemented by an SRAM (Static RAM) or the like. The RAM 214 stores various data such as program control variables, setting values registered by the user, and management data for managing the information processing apparatus 200. The RAM 214 can be used as various work buffers. The image memory 215 is implemented by a memory such as a DRAM (Dynamic RAM). The image memory 215 temporarily stores image data received via the WLAN unit 201 and those read out from the data storage unit 223 so as to be processed by the CPU 212. The nonvolatile memory 222 is implemented by a memory such as a flash memory, and holds stored data even after the information processing apparatus 200 is powered off.

Note that the memory arrangement of the information processing apparatus 200 is not limited to the above-described one. For example, the image memory 215 and the RAM 214 may share a memory, or data may be backed up using the data storage unit 223. In this embodiment, an example of the image memory 215 is a DRAM. However, another storage medium such as an HDD (Hard Disk Drive) or a nonvolatile memory may be used.

The data conversion unit 216 can execute analysis of data of various formats in addition to data conversion such as color conversion and image conversion. The telephone unit 217 controls a telephone line, and can implement telephone communication by processing audio data input/output via the loudspeaker unit 224. The GPS 219 acquires position information such as the current latitude and longitude of the information processing apparatus 200 by receiving a radio wave sent from a satellite. The camera unit 221 has a function of electronically recording and encoding an image input via a lens. Image data obtained by image capturing of the camera unit 221 is saved in the data storage unit 223. The loudspeaker unit 224 executes control to implement a function of inputting/outputting audio for a telephone function, an alarm notification function, and the like. The power supply unit 225 includes a battery, and controls power supply to each element in the apparatus. A power supply state includes, for example, a battery dead state in which the remaining battery amount is equal to or less than a reference, a power-off state in which the power key 204 is not pressed, a power-on state (active state) in which the power key 204 is pressed, and a power saving state in which the power consumption of each element is suppressed.

The display unit 202 electronically controls the display contents to execute control for a user operation input to be performed and display of the operation state and status condition of the MFP 300. The operation unit 203 outputs, in response to acceptance of an operation input from the user, an electrical signal corresponding to the operation input to the CPU 212. As described above with reference to FIG. 5, a touch panel display can be used as the display unit 202 and the operation unit 203.

The information processing apparatus 200 can perform wireless communication using the WLAN unit 201, and performs data communication with another device such as the MFP 300. For example, the information processing apparatus 200 converts data into packets, and transmits the packets to another external device. The information processing apparatus 200 receives packets from another external device via the WLAN unit 201, reconstructs the packets into original data, and outputs the data to the CPU 212.

The arrangement of the main board 211 is not limited to the above-described example. For example, each function of the main board 211 implemented by the CPU 212 may be implemented by a processing circuit such as an ASIC (Application Specific Integrated Circuit), that is, either hardware or software.

(Arrangement of Access Point)

FIG. 7 shows an example of the arrangement of the access point 700 having a wireless LAN access point function. The access point 700 includes a main board 710 that performs system control, a wireless LAN unit 716, a wired LAN unit 718, and an operation button 720. The main board 710 includes a CPU 711, a program memory 713, a data memory 714, a wireless LAN communication control unit 715, a wired LAN communication control unit 717, an operation unit control circuit 719, a terminal access control unit 721, and a channel change unit 722. These are connected by an internal bus 712 to be communicable with each other. Note that processing to be explained below as processing executed by the access point 700 is actually implemented when the CPU 711 executes a program stored in the program memory 713, the data memory 714, or the like.

The CPU 711 performs calculation processing based on a control program stored in the program memory 713 and data held in the data memory 714. The CPU 711 can control the wireless LAN unit 716 by the wireless LAN communication control unit 715 to perform wireless LAN communication with another communication information processing apparatus. The CPU 711 can control the wired LAN unit 718 by the wired LAN communication control unit 717 to perform wired LAN communication with another communication information processing apparatus. Furthermore, the CPU 711 can accept an operation input from the user by the operation button 720 by controlling the operation unit control circuit 719.

The terminal access control unit 721 protects the network by authenticating a communication apparatus to be connected to the network. Examples of an authentication method are the PSK method using a PSK (Pre Shared Key), and the SAE method using an SAE (Simultaneous Authentication of Equals). Alternatively, the EAP method using the authentication server complying with IEEE802.1X/EAP can be used (IEEE802.1X/EAP will sometimes simply be referred to as "802.1X/EAP" hereinafter in the drawings). The channel of authenticated communication can be changed or switched by the channel change unit 722.

(Arrangement of Authentication Server)

FIG. 8 shows an example of the arrangement of the authentication server 800. The authentication server 800 includes a main board 811 that performs system control, and a communication unit 801 that performs wired LAN communication.

The main board 811 includes a CPU 812, a ROM 813, a RAM 814, an image memory 815, a nonvolatile memory 822, a data storage unit 823, and a communication control unit 826. The main board 811 further includes a display unit 802 and an operation unit 803. These are connected to each other via a system bus (bus cable) 828. The main board 811 is connected to the communication unit 801 by the communication control unit 826.

The CPU 812 functions as a system control unit that controls the overall authentication server 800. The processing of the authentication server 800 is implemented when the CPU 812 loads a program stored in the ROM 813 into the RAM 814 and executes it.

More specifically, the ROM 813 stores a control program to be executed by the CPU 812, an embedded OS program, and the like. The CPU 812 executes a corresponding program under the embedded OS, thereby performing software control such as scheduling or task switching. The RAM 814 is implemented by an SRAM or the like. The RAM 814 stores various data such as program control variables, setting values registered by the user, and management data for managing the authentication server 800. The RAM 814 can be used as various work buffers. The image memory 815 is implemented by a memory such as a DRAM. The image memory 815 temporarily stores image data received via the communication unit 801 and those read out from the data storage unit 823 so as to be processed by the CPU 812. The data storage unit 823 is implemented by a storage medium such as an SSD (Solid State Drive), and holds stored data even after the authentication server 800 is powered off. As another example of the data storage unit 823, another storage medium such as an HDD or nonvolatile memory may be used.

Note that each function of the main board 811 described here may be implemented by either hardware or software, similar to the main board 211.

The display unit 802 electronically controls the display contents to execute control for a user operation input to be performed and display of the status condition. The operation unit 803 outputs, in response to acceptance of an operation input from the user, an electrical signal corresponding to the operation input to the CPU 812.

The authentication server 800 can perform data communication with the access point 700 (or another device) via the communication unit 801 by the communication control unit 826. For example, the authentication server 800 converts data into packets, and transmits the packets to another external device. The communication unit 801 receives packets from another external device, reconstructs the packets into original data, and outputs the data to the CPU 812. The communication unit 801 can perform data (packet) communication in a wired LAN (Ethernet) system complying with, for example, the IEEE802.3 series.

(P2P Communication Method)

Wireless Direct communication in which communication apparatuses directly (without intervention of the external access point 700), wirelessly communicate with each other in WLAN communication will be described. For example, a communication apparatus can support a plurality of modes for Wireless Direct communication, and execute P2P communication (WLAN) by selectively using one of the plurality of modes. As P2P modes, the following two modes are assumed.

mode A (Software AP mode)
mode B (Wi-Fi Direct (WFD) mode)

A communication apparatus capable of executing P2P communication can be configured to support at least one of these modes (in this specification, mode A and mode B can collectively be represented as a Wireless Direct mode). A communication apparatus capable of executing P2P communication need not support all the modes, and may be configured to support some of the modes.

Note that the MFP 300 operating in the P2P mode operates as a master in connection/communication to/with another apparatus. The WFD mode is not limited to this, and the MFP 300 may operate as a station by executing group owner negotiation. Furthermore, the communication apparatus can support the wireless infrastructure mode (mode C) in addition to the P2P modes.

In a communication apparatus (for example, the information processing apparatus 200) having the WFD communication function, if a user operation is accepted via an operation unit, an application (or a dedicated application) for implementing the communication function is called. This communication apparatus can display a UI (User Interface) screen provided by the application to prompt the user to input an operation, and execute WFD communication based on the input operation.

(Wireless Infrastructure Mode)

In the wireless infrastructure mode, communication apparatuses (for example, the information processing apparatus 200 and the MFP 300) which communicate with each other are connected to an external access point (in this example, the AP 700) that controls a network and communication between the communication apparatuses is performed via the AP. In other words, communication between the communication apparatuses is implemented via the network created by the AP. The MFP 300 operating in the wireless infrastructure mode operates as a station in connection/communication to/with the access point 700.

In the wireless infrastructure mode, each apparatus searches for an access point by transmitting an apparatus search request (Probe Request). If each apparatus receives an apparatus search response (Probe Response) from the access point, it displays an SSID (Service Set Identifier) included in the apparatus search response. Each of the information processing apparatus 200 and the MFP 300 finds the access point 700, transmits a connection request to the access point 700, and is connected to the access point 700, thereby enabling communication between these communication apparatus in the wireless infrastructure mode via the access point 700.

Note that a plurality of communication apparatuses may be connected to different APs. In this case, when data transfer is performed between the APs, communication between the communication apparatuses is possible. As commands and parameters transmitted/received at the time of communication between the communication apparatuses, commands and parameters complying with the Wi-Fi standard are used.

The access point 700 decides the frequency band and the frequency channel. For example, the access point 700 can select one of the 5- and 2.4-GHz frequency bands to be used and select the frequency channel to be used in the frequency band.

When the information processing apparatus 200 or the MFP 300 is connected to the wireless LAN formed by the access point 700, the access point 700 performs authentication. The information processing apparatus 200 or the MFP 300 is connected to the wireless LAN formed by the access point 700 using a wireless LAN authentication method such as the PSK method, SAE method, or EAP method in accordance with the authentication method of the wireless LAN formed by the access point 700.

(Wired Communication Mode)

In the wired communication mode, a communicate apparatus (for example, the MFP 300) can communicate with another communication apparatus via a wired interface such as a wired LAN. For example, when the MFP 300 executes communication in the wired communication mode, communication in the wireless infrastructure mode is restricted. In the wired communication mode, for example, data (packet) communication in the wired LAN (Ethernet) complying with the IEEE802.3 series is possible. When operating in a state in which the IEEE802.1X/EAP setting is enabled, the MFP 300 executes IEEE802.1X authentication to be connected to the wired LAN formed by the access point 700.

(Simultaneous Wireless Operation)

When communication in each of the two modes is communication by the authentication method not using the authentication server 800, the MFP 300 can execute communications in the respective modes simultaneously (in parallel). That is, connection for executing communication in each mode is maintained, thereby simultaneously maintaining a plurality of connections corresponding to a plurality of communication modes. More specifically, for example, communication in the wireless infrastructure mode and communication in the P2P mode can be executed simultaneously. Therefore, the MFP 300 maintains both connection for communication in the wireless infrastructure mode and connection for communication in the P2P mode simultaneously. This operation may be expressed as a "simultaneous wireless operation". In other words, the simultaneous wireless operation can be regarded as an operation in which the MFP 300 simultaneously executes an operation as a station in Wi-Fi communication in the wireless infrastructure mode and an operation as a master in Wi-Fi communication in the P2P mode. On the other hand, if the MFP 300 performs communication by the authentication method using the authentication server 800, it does not maintain infrastructure connection and P2P connection simultaneously.

(Overview of Processing)

FIGS. 8 to 17 each show a system configuration example, a sequence chart, or a flowchart that can implement communication according to this embodiment. Each step of the flowcharts can be performed when the corresponding CPU loads a program stored in the ROM into the RAM and executes it.

(Screen Flow)

FIGS. 11A to 11J are views showing a screen flow when a LAN setting is selected from the setting menu of the screen 408 shown in FIG. 4B on the operation display unit 302 of the MFP 300.

Figure 11A:
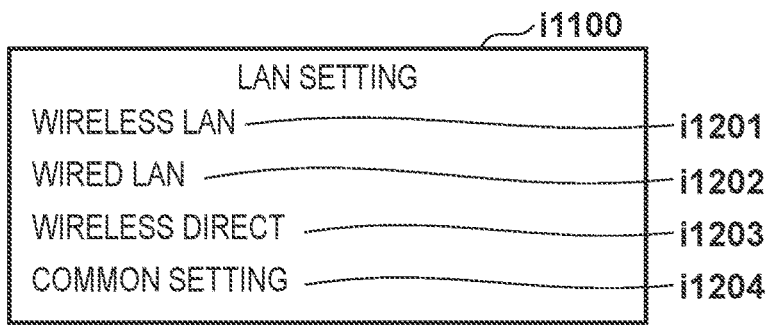
FIGS. 11A to 11J are views each showing an example of a screen displayed when a LAN setting is performed on the operation display unit of the MFP.

A screen i1100 shown in FIG. 11A is a screen which is displayed when the LAN setting is selected in the screen 408 shown in FIG. 4B and in which the LAN setting can be changed. In the screen i1100, "wireless LAN" i1201, "wired LAN" i1202, "Wireless Direct" i1203, and "common setting" i1204 are displayed.

Figure 11B:
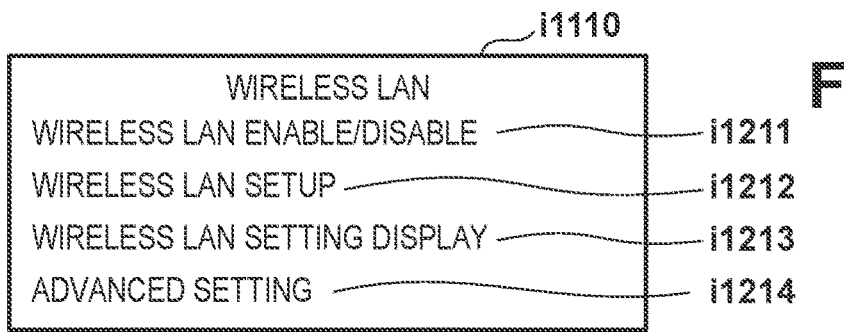

A screen i1110 shown in FIG. 11B is a screen which is displayed when the "wireless LAN" i1201 is selected in the screen i1100 shown in FIG. 11A and in which the wireless LAN setting can be changed. In the screen i1110, "wireless LAN enable/disable" i1211, "wireless LAN setup" i1212, "wireless LAN setting display" i1213, and "advanced setting" i1214 are displayed. The "wireless LAN enable/disable" i1211 is a region for enabling or disabling a state in which the MFP 300 can perform communication using the wireless LAN. When a user operation is accepted in a display screen after the region is selected, the state in which the MFP 300 can perform communication using the wireless LAN is disabled or enabled.

Note that in a state in which that state is disabled, the MFP 300 executes no communication or connection using the wireless LAN.

Figure 11C:
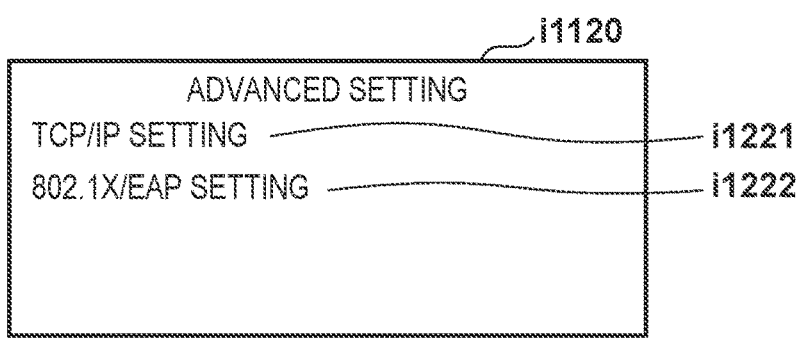

A screen i1120 shown in FIG. 11C is a screen which is displayed when the "advanced setting" i1214 is selected in the screen i1110 shown in FIG. 11B and in which the LAN advanced setting can be changed. In the screen i1120, "TCP/IP setting" i1221 and "802.1X/EAP setting" i1222 are displayed.

Figure 11D:
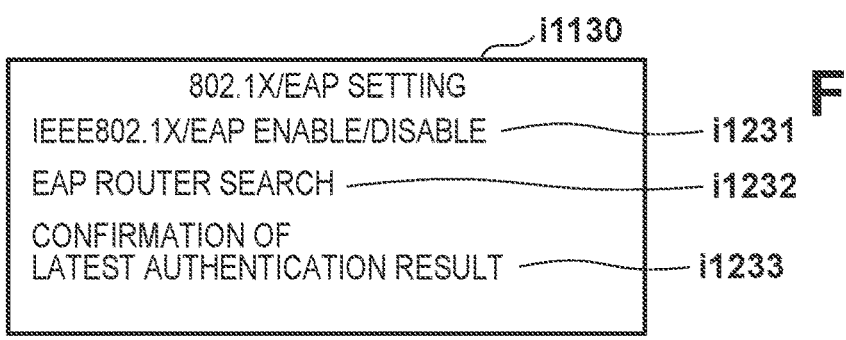

A screen i1130 shown in FIG. 11D is a screen which is displayed when the "802.1X/EAP setting" i1222 is selected in the screen i1120 shown in FIG. 11C and in which the 802.1X/EAP setting can be changed. In the screen i1130, "IEEE802.1X/EAP enable/disable" i1231, "EAP router search" i1232, and "confirmation of latest authentication result" i1233 are displayed.

Figure 11E:
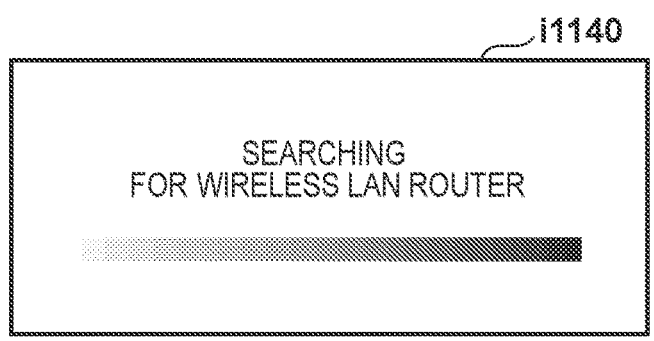

A screen i1140 shown in FIG. 11E is a screen which is displayed while a search for a wireless access point of the authentication method using the authentication server 800 is executed. The access point search can be executed in response to selection of the "EAP router search" i1232 in the screen i1130 shown in FIG. 11D while the IEEE802.1X/EAP setting is enabled.

Note that the screen i1140 shown in FIG. 11E is also displayed while the "wireless LAN setup" i1212 is selected in the screen i1110 shown in FIG. 11B and a search for a wireless access point of the authentication method not using the authentication server 800 is executed.

Figure 11F:
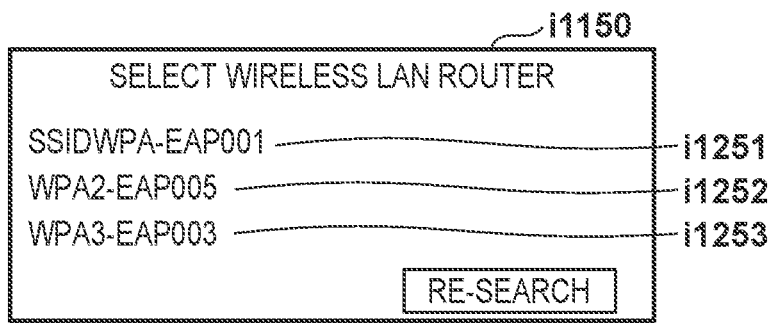

A screen i1150 shown in FIG. 11F is an example of a screen for displaying a list of the identifiers (SSIDs) of wireless access points as a result of the access point search (AP search). In the screen i1150, "SSIDWPA-EAP001" i1251, "WPA2-EAP005" i1252, and "WPA3-EAP003" i1253 are displayed. These correspond to the WPA-EAP method, WPA2-EAP method, and WPA3-EAP method, respectively.

Note that as other display examples, known methods such as the WPA-PSK method, WPA2-PSK method, and WPA3-SAE methods may be displayed, or the OPEN method may additionally be displayed.

If the "EAP router search" i1232 is executed, only the SSIDs of access points whose authentication method is the EAP method are displayed in the screen i1150 shown in FIG. 11F. If the "wireless LAN setup" i1212 is executed, only the SSIDs of access points whose authentication method is not the EAP method are displayed.

Figure 11G:
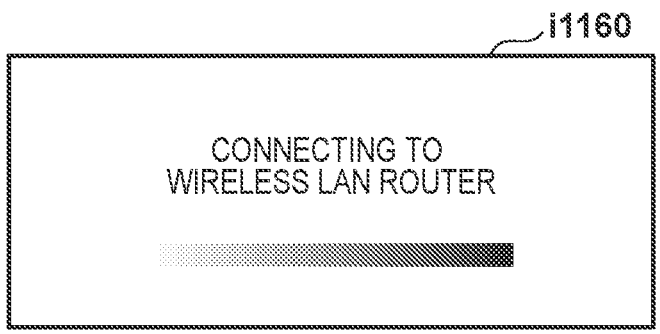

A screen i1160 shown in FIG. 11G is a screen which is displayed while the SSID (one of i1251 to i1253) of the access point is selected in the screen i1150 shown in FIG. 11F and the MFP 300 executes processing for connecting to the access point. As another form, another display may be executed to represent that the connection processing is in progress.

Figure 11H:
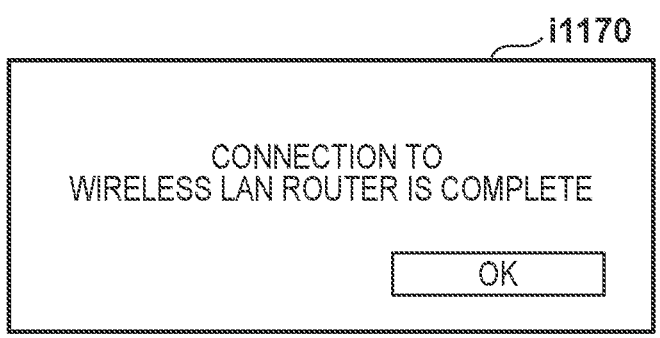

A screen i1170 shown in FIG. 11H is a screen which is displayed when, after the screen i1160 shown in FIG. 11G is displayed, the attempt to execute connection to the access point is complete, and the connection succeeds or the connection proceeds to a predetermined stage.

Figure 11I:
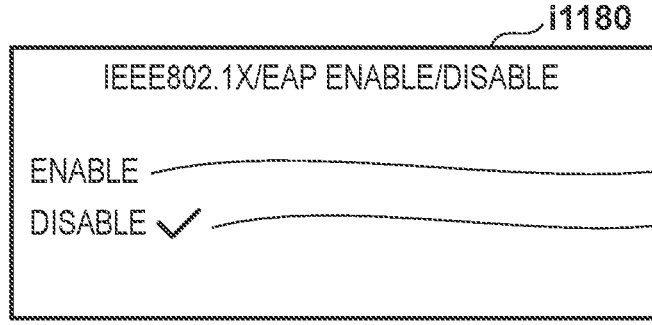

A screen i1180 shown in FIG. 11I is a screen which is displayed when the "802.1X/EAP enable/disable" i1231 is selected in the screen i1130 shown in FIG. 11D and in which enable/disable of the 802.1X/EAP setting can be changed. In the screen i1180, "enable" i1251 and "disable" i1252 are displayed. In a state in which the 802.1X/EAP setting is disabled, the MFP 300 executes no connection to the access point by IEEE802.1X/EAP.

Figure 11J:
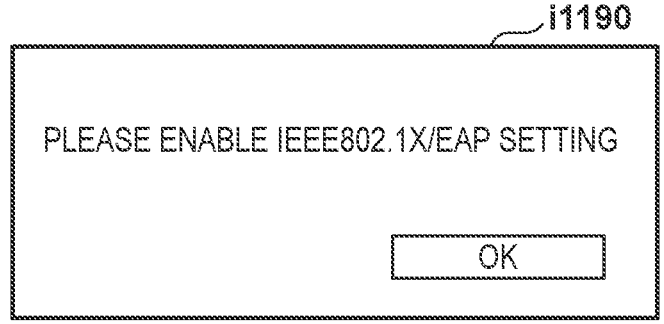

A screen i1190 shown in FIG. 11J is a screen which is displayed when the "EAP router search" i1232 is selected while the IEEE802.1X/EAP setting is disabled in the screen i1130 shown in FIG. 11D. That is, in this embodiment, if the IEEE802.1X/EAP setting is disabled, even if the "EAP router search" i1232 is selected, no router search is executed.

Note that control not to execute connection to the access point by the IEEE802.1X/EAP authentication, which is executed when the IEEE802.1X/EAP setting is disabled, is not limited to the above-described control. For example, the MFP 300 may execute a router search but need not display, in a list of access points found by the router search, an access point in which IEEE802.1X/EAP authentication is enabled. Alternatively, an access point in which IEEE802.1X/EAP authentication is enabled may also be displayed in the list but even if the user selects the access point, the MFP 300 need not execute processing for connecting to the access point in which IEEE802.1X/EAP authentication is enabled.

(Setting of Authentication Information in IEEE802.1X/EAP)

In the case of the MFP 300 to be connected to the network in which IEEE802.1X/EAP authentication is enabled, authentication needs to be started after setting necessary information in the MFP 300.

FIG. 9 is a flowchart executed by the MFP 300 when the MFP 300 joins the network, created by the access point 700, in which IEEE802.1X/EAP authentication is enabled.

In step S901, the MFP 300 connects the information processing apparatus 200 and the MFP 300 to each other by a connection method in which IEEE802.1X/EAP authentication is disabled. More specifically, for example, the MFP 300 accepts a connection request from the information processing apparatus 200 and establishes connection between the information processing apparatus 200 and the MFP 300 operating in the P2P mode.

In step S902, the MFP 300 receives authentication information from the information processing apparatus 200 with respect to the MFP 300, and executes setting concerning IEEE802.1X/EAP authentication using the information. This setting can be done when the information processing apparatus 200 transmits the authentication information to the MFP 300 via the connection established in step S901, and the MFP 300 receives the authentication information.

In step S903, the MFP 300 is connected to the network, created by the access point 700, in which IEEE802.1X/EAP authentication is enabled. In other words, the MFP 300 establishes connection to the access point in which IEEE802.1X/EAP authentication is enabled.

Figure 10A:
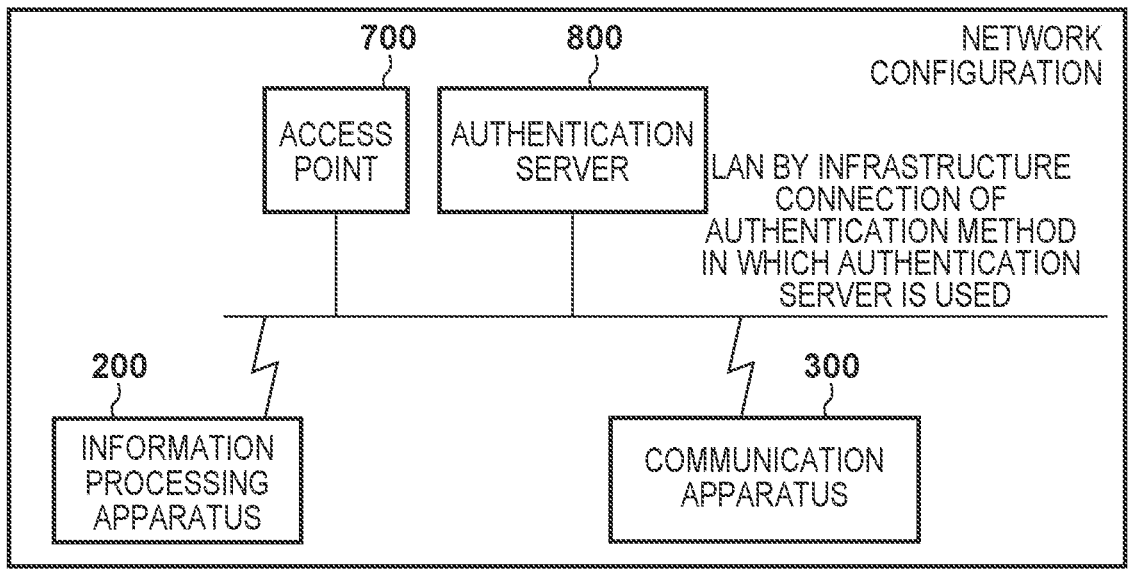
FIGS. 10A to 10C are views each showing an example of a network configuration.
Figure 10B:
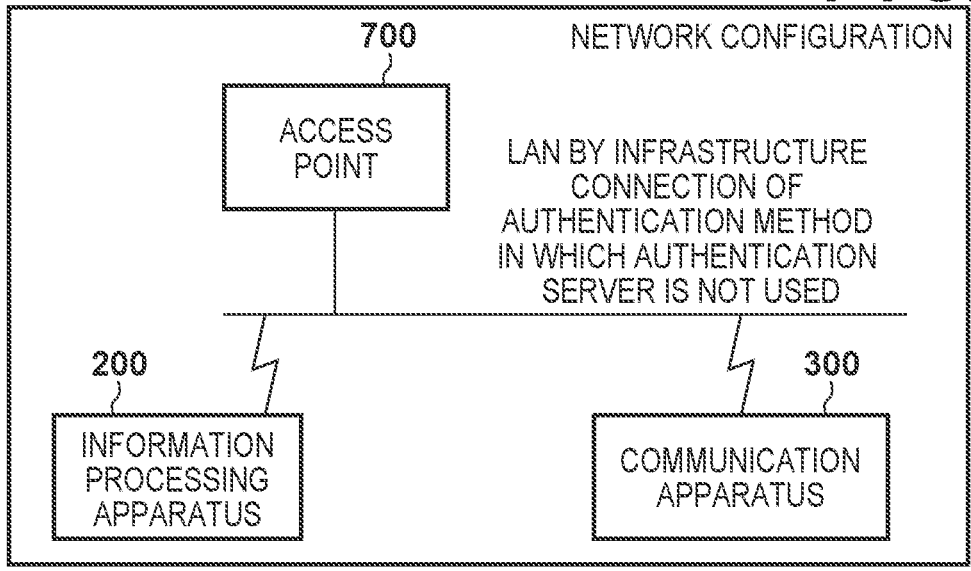
Figure 10C:
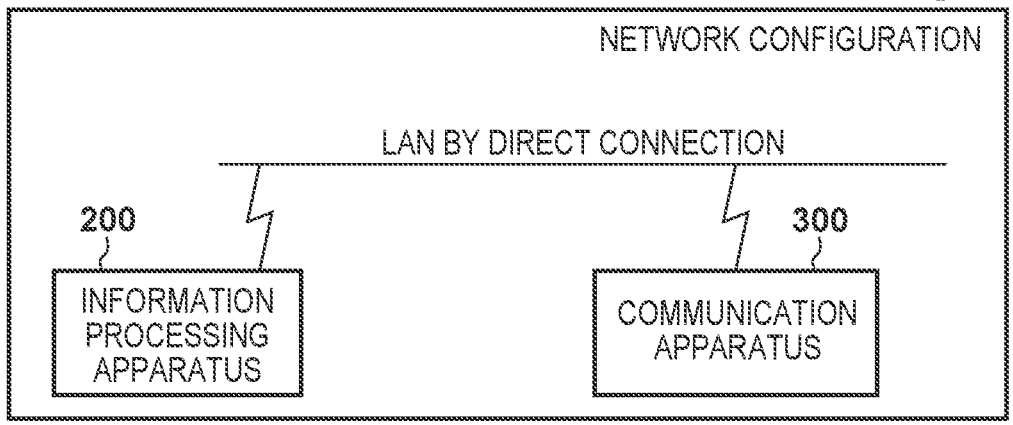

In step S901, by operating the information processing apparatus 200 and the MFP 300, communication between the apparatuses can be implemented based on authentication executed by the authentication server 800 in cooperation with the access point 700, as shown in FIG. 10A. As another form, as shown in FIG. 10B, communication between the apparatuses may be implemented via the AP 700 by connecting to the network, created by the AP 700, in which IEEE802.1X/EAP authentication is disabled. As still another form, as shown in FIG. 10C, connection between the information processing apparatus 200 and the MFP 300 may be implemented by connecting the information processing apparatus 200 to a network created by the MFP 300 operating as a Wireless Direct master.

Figure 12A:
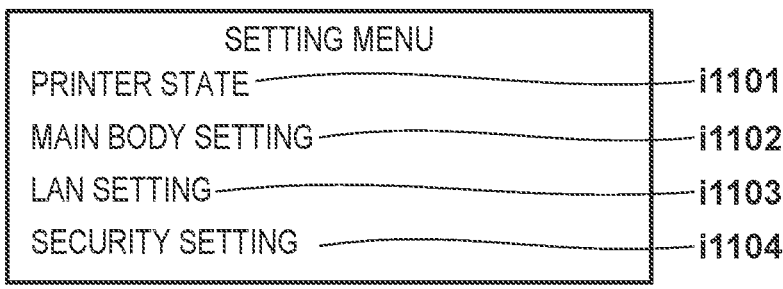
FIGS. 12A to 12G are views each showing an example of an MFP setting screen displayed on the information processing apparatus.

FIG. 12A shows an example of the setting screen of the MFP 300 displayed on the information processing apparatus 200. This screen is displayed when a Web browser or application operating on the information processing apparatus 200 communicates with an HTTP server operating on the MFP 300. This screen may be displayed based on a standby response of an HTTP request in USB communication using the USB communication control unit 320 of the MFP 300. In this screen, "printer state" i1101, "main body setting" i1102, "LAN setting" i1103, and "security setting" i1104 are displayed.

Figure 12B:
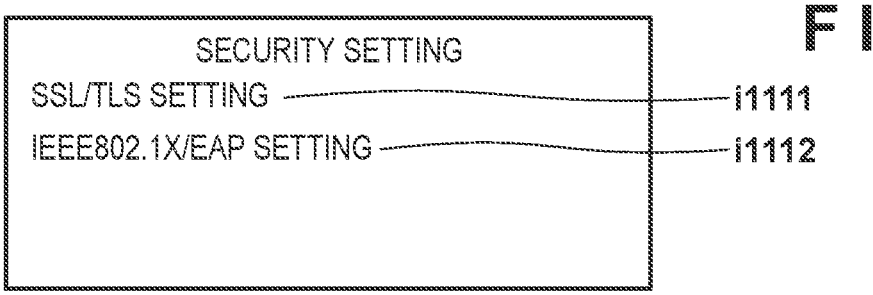

A screen shown in FIG. 12B is displayed when the "security setting" i1104 is selected in FIG. 12A. In this screen, "SSL/TLS setting" i1111 and "IEEE802.1X/EAP setting" i1112 are displayed.

Figure 12C:
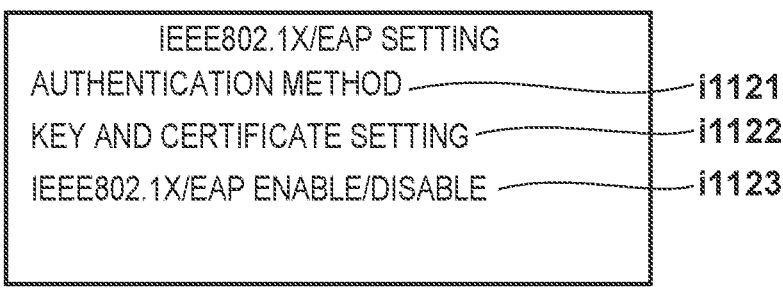

A screen shown in FIG. 12C is displayed when the "IEEE802.1X/EAP setting" i1112 is selected in FIG. 12B. In this screen, "authentication method" i1121, "key and certificate setting" i1122, and "IEEE802.1X/EAP enable/disable" i1123 are displayed.

Figure 12D:
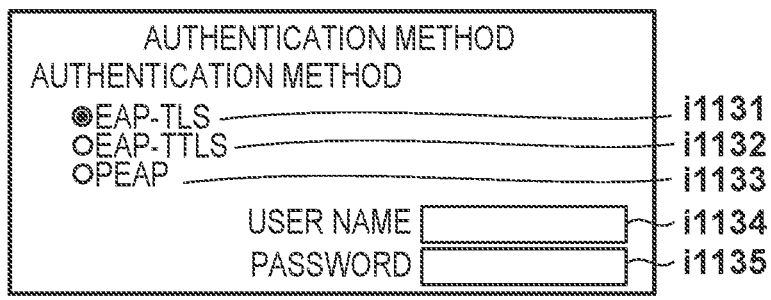

A screen shown in FIG. 12D is displayed when the "authentication method" i1121 is selected in FIG. 12C. In this screen, "EAP-TLS" i1131, "EAP-TTLS" i1132, and "PEAP" i1133 of the authentication methods, an input field i1134 of a user name (login name), and an input field i1135 of a password are displayed. When one of i1131 to i1133 is selected, the authentication method to be used at the time of IEEE802.1X/EAP authentication is set in the MFP 300. When the user name and the password are input to the fields i1134 and i1135, respectively, the user name and the password to be used at the time of IEEE802.1X/EAP authentication are set in the MFP 300.

When registering a certificate to be used at the time of IEEE802.1X/EAP authentication in the MFP 300, the "key and certificate setting" i1122 is selected in the screen shown in FIG. 12C. After that, by selecting "key and certificate upload" i1141 in the screen shown in FIG. 12E, a screen shown in FIG. 12F is displayed. In this screen, a file is selected as a certificate in a field i1161, a password is input as a key in a field i1162, and then "upload" i1163 is selected, thereby completing the uploading of the key and certificate.

Figure 12E:
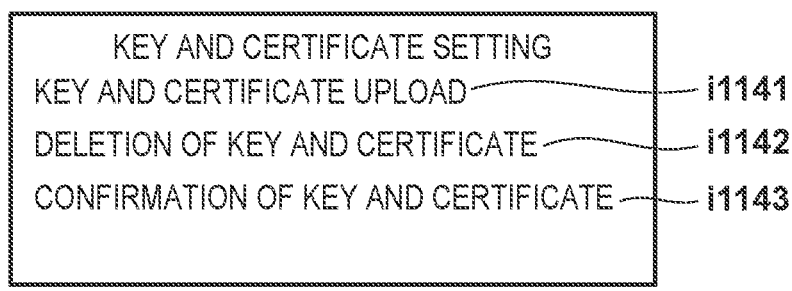
Figure 12F:
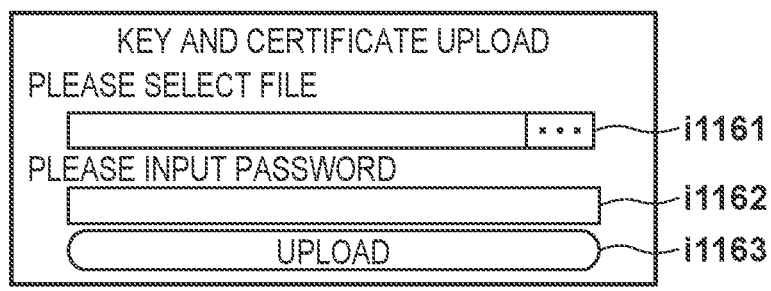

Note that in the screen shown in FIG. 12E, by selecting "deletion of key and certificate" i1142, it is possible to delete a certificate saved in the MFP 300, or by selecting "confirmation of key and certificate" i1143, it is possible to display a list of certificates saved in the MFP 300.

Figure 12G:
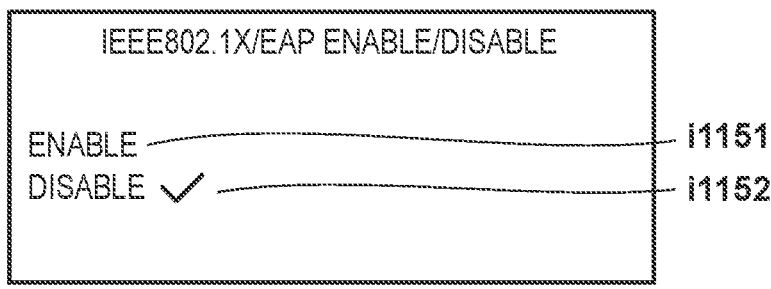

A screen shown in FIG. 12G is displayed when the "IEEE802.1X/EAP enable/disable" i1123 is selected in FIG. 12C. In this screen, the IEEE802.1X/EAP setting of the MFP 300 can be enabled or disabled.

As described above, the authentication information to be used in IEEE802.1X/EAP can be set in the MFP 300. When the authentication server 800 authenticates the MFP 300 using the authentication information, the MFP 300 can be connected to the network that is formed by the access point 700 and uses the authentication server 800. In this example, if the MFP 300 can enable a plurality of communication modes (infrastructure connection and P2P connection in this example) simultaneously, the MFP 300 can connect the communication apparatus to the network using the authentication server 800 on the infrastructure connection side, and also connect the communication apparatus on the P2P side. In this case, an apparatus which is not authenticated by the authentication server 800 can change the settings of the MFP 300 and issue a print request.

If the MFP 300 is connected to the network using the authentication server 800 on the infrastructure connection side, the change of the settings of the MFP 300 and execution of printing by an apparatus which is not authenticated by the authentication server 800 are preferably suppressed regardless of the switching order of the communication mode. In this embodiment, by dynamically switching the communication mode in accordance with the IEEE802.1X/EAP setting of the MFP 300 and wireless infrastructure authentication method, it is possible to reduce the time required to set the communication mode.

Note that in this embodiment, the enabled state (ON state)/disabled state (OFF state) of each communication mode is managed. For example, in the MFP 300, it is possible to switch the enabled communication mode and control communication by controlling the wireless communication unit 307 and the communication unit 321.

(Wireless Infrastructure (EAP) Setup)

Figure 13A:
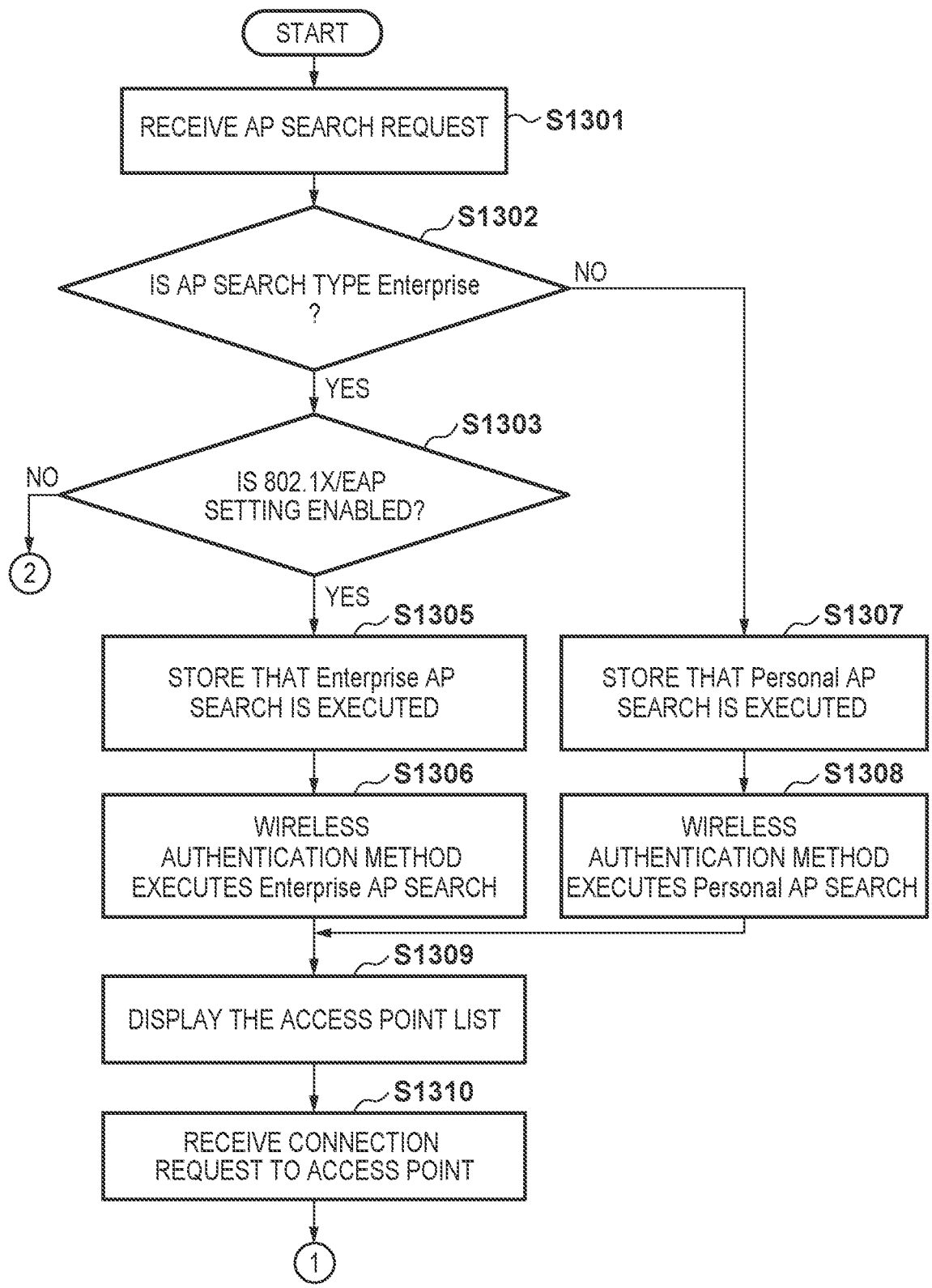

FIG. 13 is a flowchart illustrating an operation when the MFP 300 executes connection to the access point 700 whose authentication method uses the authentication server 800. This flowchart is executed when the "wireless infrastructure (EAP) router search" i1232 is selected in the screen i1130 shown in FIG. 11D. This can switch the communication mode regardless of the switching order when causing the MFP 300 to join the wireless infrastructure network, created by the AP 700, of the authentication method using the authentication server. Before execution of EAP setup processing, information to be used for IEEE802.1X/EAP authentication is preset in the MFP 300 (see FIG. 9). If no authentication information is set in the MFP 300, EAP authentication fails.

In step S1301, the MFP 300 receives a search request (AP search request) of the access point 700. In response to the reception of the search request, the process advances to step S1302.

In step S1302, the MFP 300 determines or judges whether the type of the search request of the access point 700 is Enterprise. If the "EAP router search" i1232 is selected in the screen i1130 shown in FIG. 11D, it is determined that the search request is the Enterprise search request. If the "wireless LAN setup" i1212 is selected in the screen i1110 shown in FIG. 11B, it is determined that the search request is not the Enterprise search request. If the MFP 300 receives the search request of the access point 700 via a communication path or the search request includes an Enterprise search instruction, it is determined that the search request is the Enterprise search request. If the type of the search request of the access point is Enterprise, the process advances to step S1303; otherwise, the process advances to step S1307.

In step S1303, the MFP 300 determines whether the IEEE802.1X/EAP setting is enabled. If the setting is enabled, the process advances to step S1305; otherwise, the process advances to step S1304.

In step S1304, the MFP 300 returns a response that an Enterprise search cannot be executed. For example, if the "EAP router search" i1232 is selected in the screen i1130 shown in FIG. 11D while the IEEE802.1X/EAP setting is disabled, the screen i1190 shown in FIG. 11J is displayed.

The MFP 300 stores, in step S1305, that the authentication method executes an Enterprise search for the access point 700, and executes the search in step S1306. Steps S1305 and S1306 may be performed in a reverse order.

The MFP 300 stores, in step S1307, that the authentication method executes a personal search for the access point (for example, an access point 700'), and executes the search in step S1308. Steps S1307 and S1308 may be performed in a reverse order.

In step S1309, the MFP 300 displays a list of the SSIDs of the wireless APs exemplified in FIG. 11F as a result of the AP search as the search in steps S1305 to S1308.

In step S1310, in response to the user selection of an access point as a connection target from the list and the reception of the connection request, the MFP 300 advances the process to step S1311.

In step S1311, the MFP 300 determines, before setup, whether the Wireless Direct mode is enabled. If the Wireless Direct mode is enabled, the process advances to step S1312; otherwise, the process advances to step S1316.

In step S1312, the MFP 300 determines whether the IEEE802.1X/EAP setting is enabled. If the setting is enabled, the process advances to step S1313; otherwise, the process advances to step S1316.

If the MFP 300 determines in step S1313 that the authentication method of the access point as the connection target is an authentication method using the authentication server, the process advances to step S1314; otherwise, the process advances to step S1316. This determination processing is performed based on contents (that is, the type of the AP search) stored in step S1305 or S1307.

The MFP 300 disables the Wireless Direct mode in step S1314, and then enables the wireless infrastructure mode in step S1315 to execute connection to the network, formed by the access point 700, of the authentication method using the authentication server. Note that disabling of the Wireless Direct mode is to set a state in which the MFP 300 establishes no Wi-Fi Direct connection to another apparatus by stopping an operation as an access point or stopping an operation as a Wi-Fi Direct group owner.

In step S1316, the MFP 300 enables the wireless infrastructure mode to execute connection to the network formed by the access point 700. Note that enabling of the wireless infrastructure mode is to start the operation in the wireless infrastructure mode.

If YES is determined in step S1311 and NO is determined in step S1312, or if YES is determined in step S1311, YES is determined in step S1312, and NO is determined in step S1313, both the communication modes of the wireless infrastructure mode (not EAP) and Wireless Direct mode are enabled.

Note that the screen i1160 shown in FIG. 11G is displayed until an attempt to execute connection to the access point in step S1315 is started when the process advances to step S1315 after the access point as the connection target is selected in step S1310. If the process advances to step S1316, the screen i1160 is displayed until the success or failure of connection to the access point is confirmed.

As described above, it is possible to cause the MFP 300 to join the wireless infrastructure network, created by the access point 700, of the authentication method using the authentication server. Thus, if the user sets the wireless infrastructure mode, it is possible to dynamically switch the communication mode without impairing convenience. If the communication mode of the authentication method using the authentication server 800 is enabled, it is possible to prevent execution of a job or change of the setting via the communication mode of the authentication method not using the authentication server 800.

Note that in step S1302, the type of the search request of the access point 700 need not be designated. In this case, the Enterprise search request may be prioritized or an attempt may be made to execute connection to the access point regardless of the type.

(AP Search)

Figure 14:
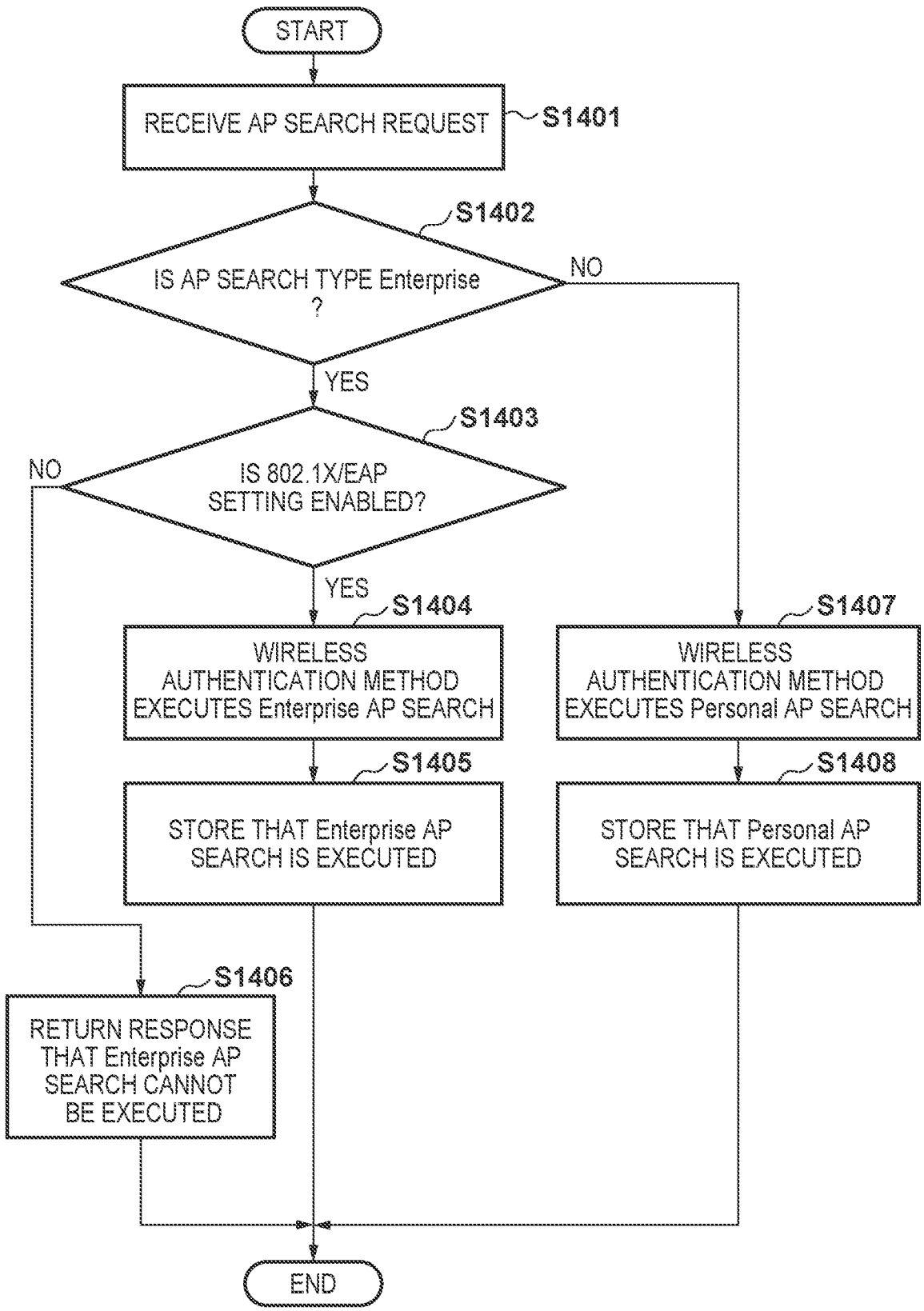
FIG. 14 is a flowchart for explaining processing of searching for wireless access points by the MFP.

FIG. 14 is a flowchart illustrating an operation when the MFP 300 executes an access point search. This flowchart is executed when the "EAP router search" i1232 is selected in the screen i1130 shown in FIG. 11D.

Processing contents in step S1401 to S1408 of FIG. 14 are the same as in steps S1301 to S1308 of FIG. 13, respectively. Thus, only if the IEEE802.1X/EAP setting is enabled, a search for an access point in which EAP authentication is enabled is executed, and it is possible to prevent connection to the access point, in which authentication is enabled, from being accidentally performed.

(Enabling of Wireless Infrastructure Mode)

Figure 15:
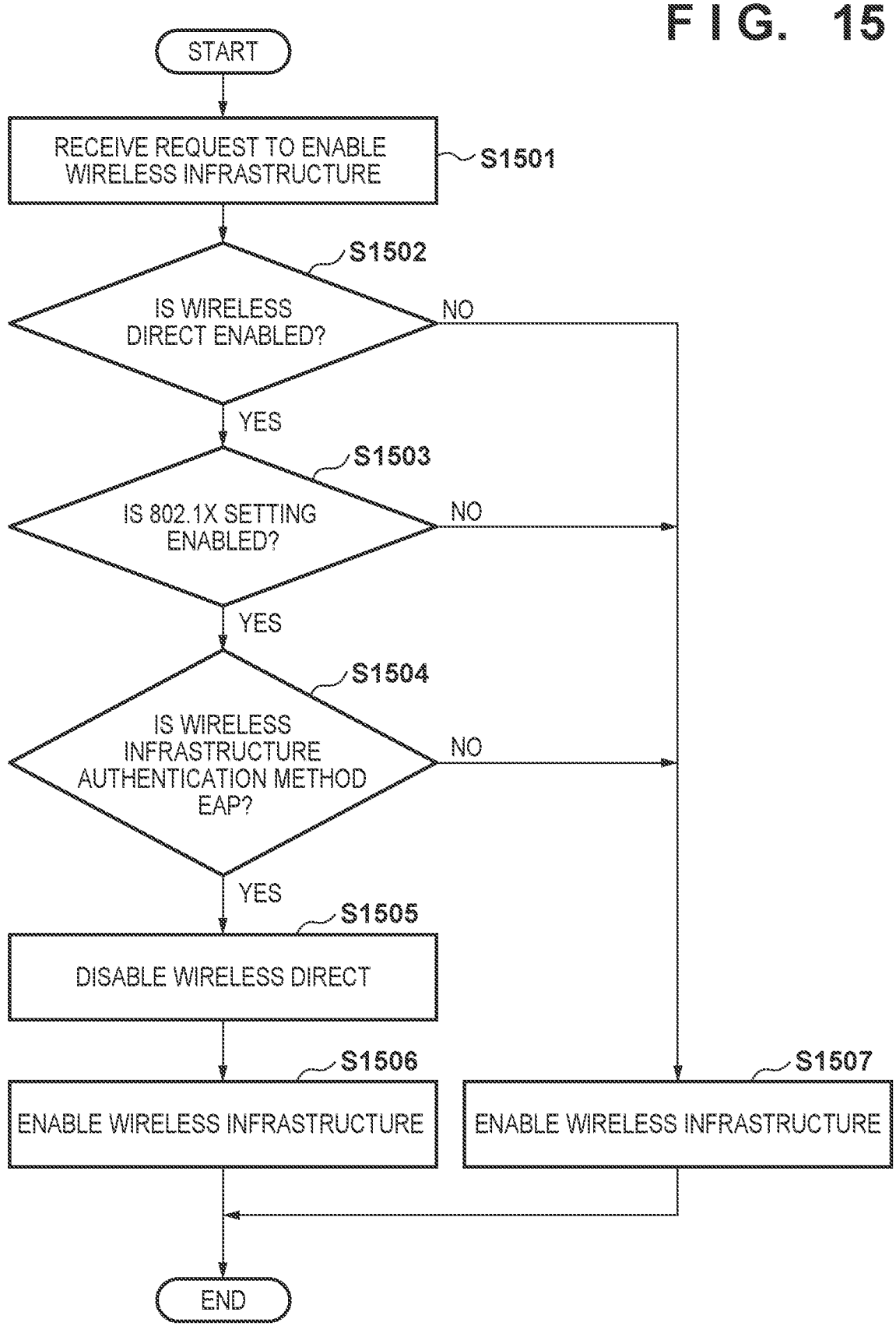
FIG. 15 is a flowchart for explaining processing in a setting of enabling a wireless infrastructure mode of the MFP.

FIG. 15 is a flowchart illustrating the operation of the MFP 300 when enabling the wireless infrastructure mode. This flowchart is executed when the "enable" i1251 is selected in the screen i1180 shown in FIG. 11I, and corresponds to step S1303 of FIG. 13.

Processing contents in step S1501 to S1507 of FIG. 15 are the same as in steps S1310 to S1316 of FIG. 13, respectively. Thus, if the user enables the wireless infrastructure mode, it is possible to dynamically switch the communication mode without impairing convenience, similar to the wireless infrastructure (EAP) setup shown in FIG. 13. Then, if the communication mode of the authentication method using the authentication server 800 is enabled, it is possible to prevent execution of a job or change of the setting via the communication mode of the authentication method not using the authentication server 800.

(Enabling of Wireless Direct Mode)

Figure 16:
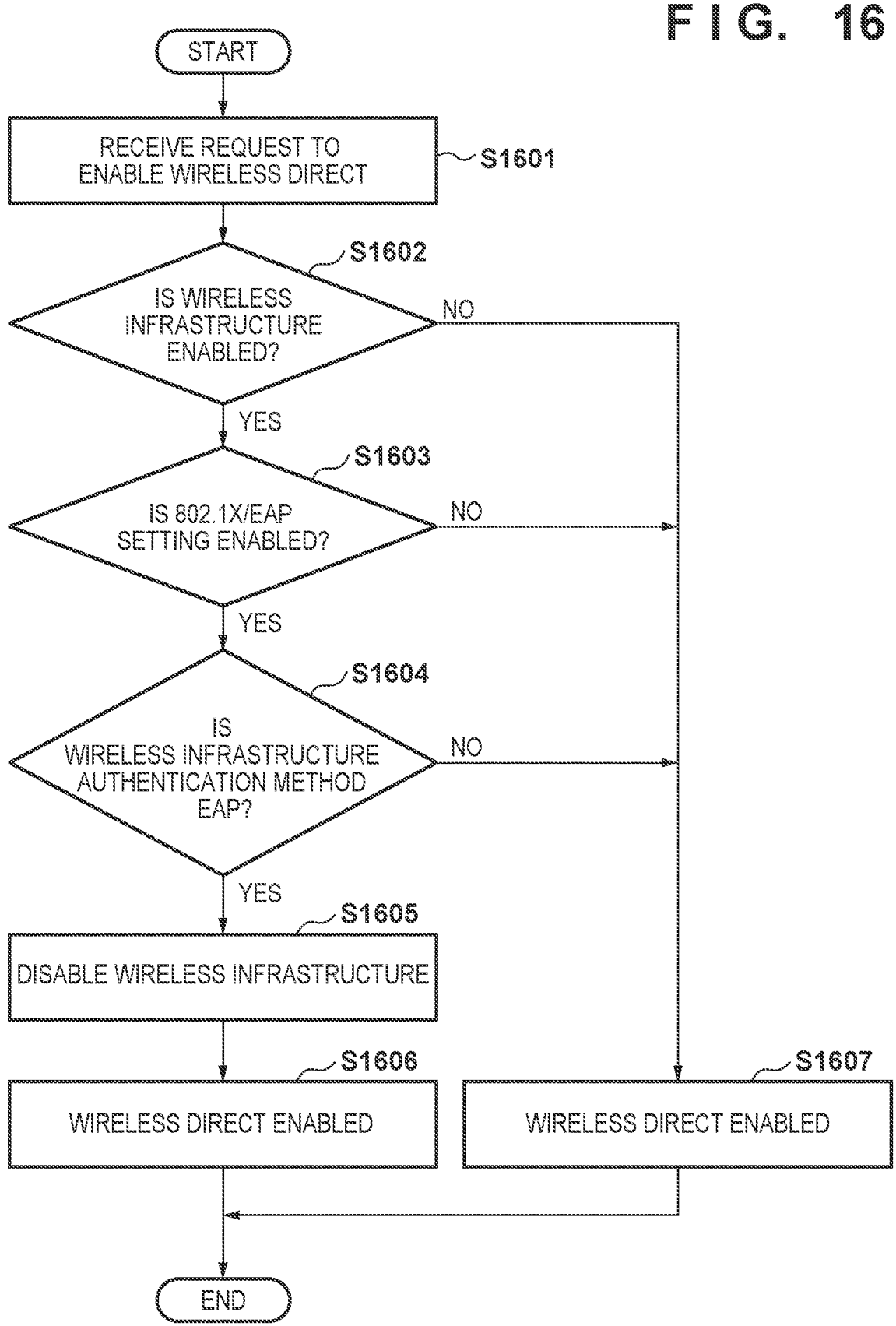
FIG. 16 is a flowchart for explaining processing in a setting of enabling a Wireless Direct mode of the MFP.

FIG. 16 is a flowchart illustrating the operation of the MFP 300 when enabling the Wireless Direct mode. This flowchart is executed when the "Wireless Direct" i1203 is selected in the screen i1100 shown in FIG. 11A. Thus, if enabling of the Wireless Direct mode is requested in a state in which the MFP 300 is already connected to the wireless infrastructure network, created by the access point 700, of the authentication method using the authentication server, it is possible to switch the communication mode regardless of the switching order.

In step S1601, in response to reception of a notification for requesting enabling of the Wireless Direct mode, the MFP 300 advances the process to step S1602.

If it is determined in step S1602 that the wireless infrastructure mode is enabled, the MFP 300 advances the process to step S1603; otherwise, the MFP 300 advances the process to step S1607.

If it is determined in step S1603 that the IEEE802.1X/EAP setting is enabled, the MFP 300 advances the process to step S1604; otherwise, the MFP 300 advances the process to step S1607.

If it is determined in step S1604 that the authentication method of the access point as the connection target is an authentication method using the authentication server, the MFP 300 advances the process to step S1605; otherwise, the MFP 300 advances to step S1607.

The MFP 300 disables the wireless infrastructure mode in step S1605, enables the Wireless Direct mode in step S1606, and is then connected to the network, formed by the access point 700, of the authentication method using the authentication server. Disabling of the wireless infrastructure mode is to disconnect, if the MFP 300 is connected to the access point, the connection to the access point, and stop the operation as a station in Wi-Fi communication.

In step S1607, the MFP 300 enables the Wireless Direct mode. If NO is determined in one of steps S1602 to S1604, both the communication modes of the wireless infrastructure mode (not EAP) and Wireless Direct mode are enabled.

According to this flowchart, if the user sets the Wireless Direct mode, it is possible to dynamically switch the communication mode without impairing convenience. If the communication mode of the authentication method using the authentication server 800 is enabled, it is possible to prevent execution of a job or change of the setting via the communication mode of the authentication method not using the authentication server 800.

(Enabling of EAP Setting)

Figure 17:
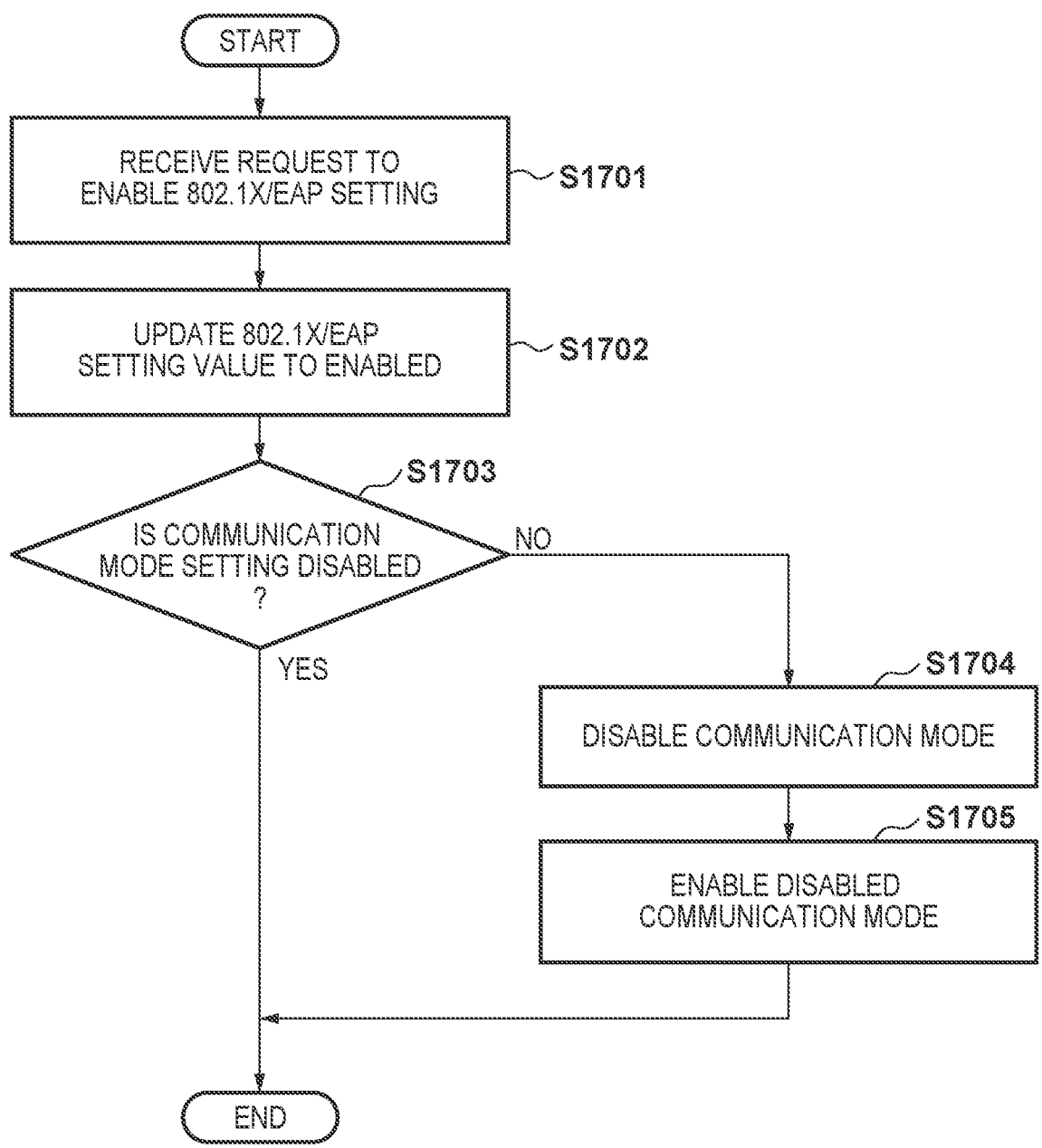
FIG. 17 is a flowchart for explaining processing in a setting of enabling an IEEE802.1X/EAP setting of the MFP.

FIG. 17 is a flowchart illustrating the operation of the MFP 300 when enabling the IEEE802.1X/EAP setting. This flowchart is executed when the "enable" i1251 is selected in the screen i1180 shown in FIG. 11I, and corresponds to step S1303 of FIG. 13.

In step S1701, the MFP 300 receives a notification for requesting enabling of the IEEE802.1X/EAP setting.

In step S1702, the MFP 300 updates the IEEE802.1X/EAP setting value recorded in the MFP 300 to "enable".

In step S1703, the MFP 300 determines whether the communication mode setting is disabled (whether the communication mode is not set). If one of the wired infrastructure mode, the wireless infrastructure mode, and the Wireless Direct mode is enabled, the process advances to step S1704. If all of them are disabled, this flowchart ends.

The MFP 300 disables the enabled communication mode in step S1704, and enables the disabled communication mode in step S1705. That is, the communication mode is reactivated. If the reactivated communication mode is the wired infrastructure mode, the IEEE802.1X/EAP setting is enabled in step S1702, and thus IEEE802.1X/EAP authentication is not performed before the reactivation while IEEE802.1X/EAP authentication is performed at the time of connection to the access point 700 after the reactivation.

(Disabling of EAP Setting)

Figure 18:
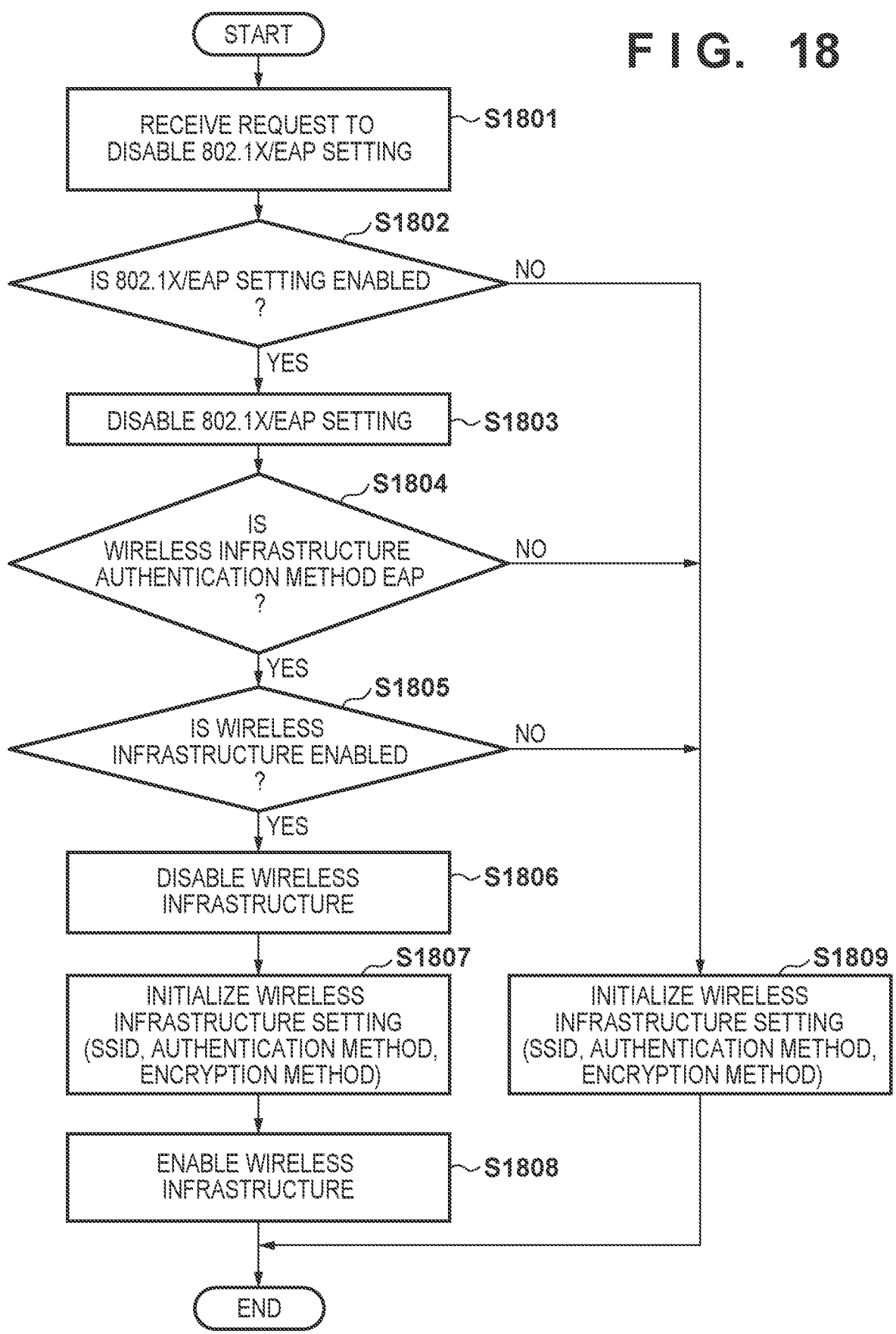
FIG. 18 is a flowchart for explaining processing in a setting of disabling the IEEE802.1X/EAP setting of the MFP.

FIG. 18 is a flowchart illustrating the operation of the MFP 300 when disabling the EAP setting. This flowchart is executed when the "disable" i1252 is selected in the screen i1180 shown in FIG. 11I. If disabling of the EAP setting is requested, the MFP 300 disables the EAP setting. If the wireless infrastructure authentication method is an authentication method using the authentication server, the MFP 300 initializes the setting values of the wireless infrastructure mode. Note that if the wireless infrastructure authentication method is not an authentication method using the authentication server, the setting values of the wireless infrastructure mode are not initialized. Even if the wireless infrastructure communication mode is disabled, if the wireless infrastructure authentication method is an authentication method using the authentication server, the setting values of the wireless infrastructure mode are initialized.

In step S1801, in response to reception of a notification for requesting disabling of the IEEE802.1X/EAP setting, the MFP 300 advances the process to step S1802.

In step S1802, the MFP 300 determines whether the IEEE802.1X/EAP setting is enabled. If the setting is enabled, the process advances to step S1803; otherwise, this flowchart ends.

In step S1803, the MFP 300 updates the IEEE802.1X/EAP setting value recorded in the MFP 300 to "disable".

In step S1804, the MFP 300 determines whether the wireless infrastructure authentication method recorded in the MFP 300 is an authentication method using the authentication server. If the wireless infrastructure authentication method is an authentication method using the authentication server, the process advances to step S1805; otherwise, this flowchart ends.

In step S1805, the MFP 300 determines whether the wireless infrastructure mode is enabled. If the wireless infrastructure mode is enabled, the process advances to step S1806; otherwise, the process advances to step S1809.

The MFP 300 disables the wireless infrastructure mode in step S1806, initializes the setting values of the wireless infrastructure mode in step S1807, and enables the wireless infrastructure mode in step S1808. More specifically, the initialization processing in step S1807 can be performed by updating, to the initial values, the SSID, authentication method, encryption method, password, and the like stored in the MFP 300.

In step S1809, the MFP 300 initializes the setting values of the wireless infrastructure mode, similar to step S1807.

(Screen Flow of Main Body Setting)

Figure 19A:
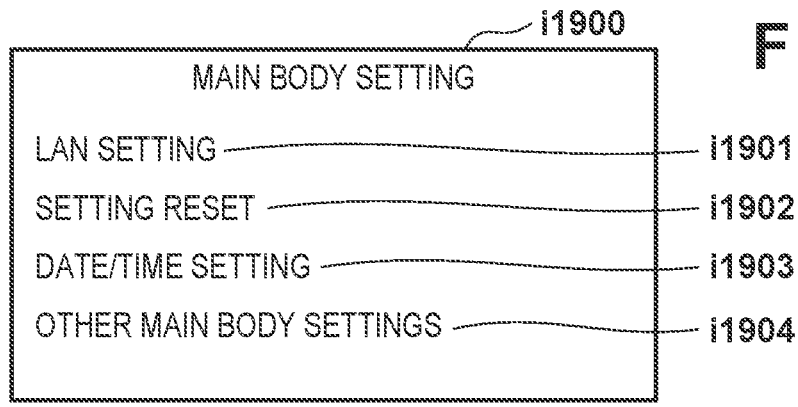
FIGS. 19A to 19C are views for explaining processing in a setting reset of the MFP.
Figure 19B:
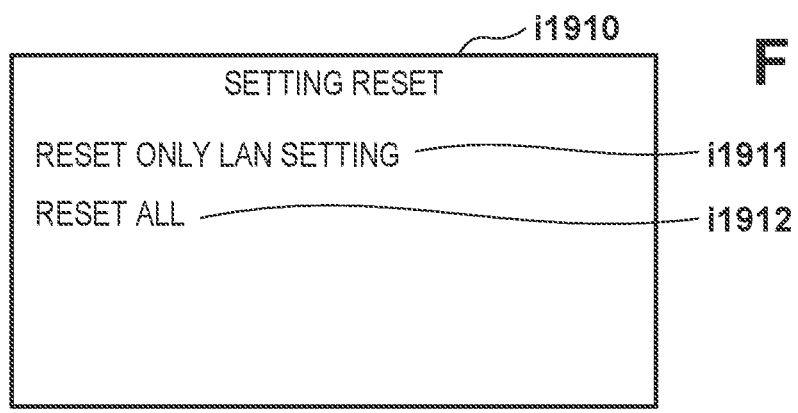
Figure 19C:
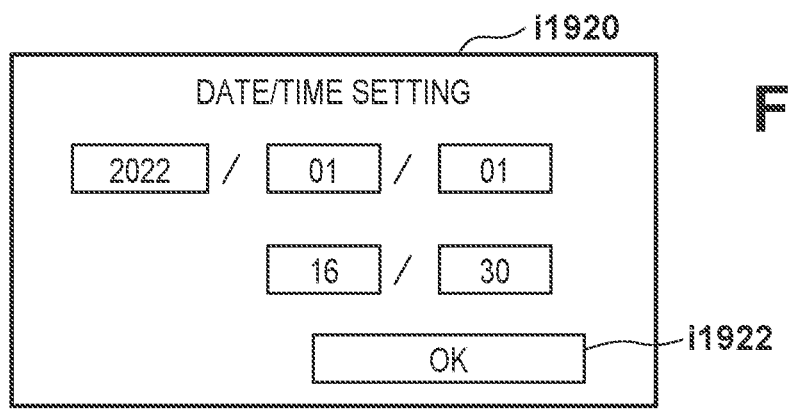

FIGS. 19A to 19C show some examples of a screen displayed when the main body setting is selected from the setting menu list displayed in the screen 408 shown in FIG. 4B on the operation display unit 302 of the MFP 300.

A screen i1900 shown in FIG. 19A is a screen which is displayed when the main body setting is selected in the screen 408 shown in FIG. 4B and in which the main body setting can be changed. In this example, "LAN setting" i1901, "setting reset" i1902, "date/time setting" i1903, and "other main body settings" i1904 are displayed.

A screen i1910 shown in FIG. 19B is a screen which is displayed when the "setting reset" i1902 is selected in the screen i1900 shown in FIG. 19A and in which the setting reset can be executed. In this example, "reset only LAN setting" i1911 and "reset all" i1912 are displayed.

A screen i1920 shown in FIG. 19C is displayed when the "date/time setting" i1903 is selected in the screen i1900 shown in FIG. 19A, and can be used to change the date and/or time setting. By inputting a date and/or time to a field i1922 of the screen i1920, the setting can be updated.

(Setting Reset)

Figure 20:
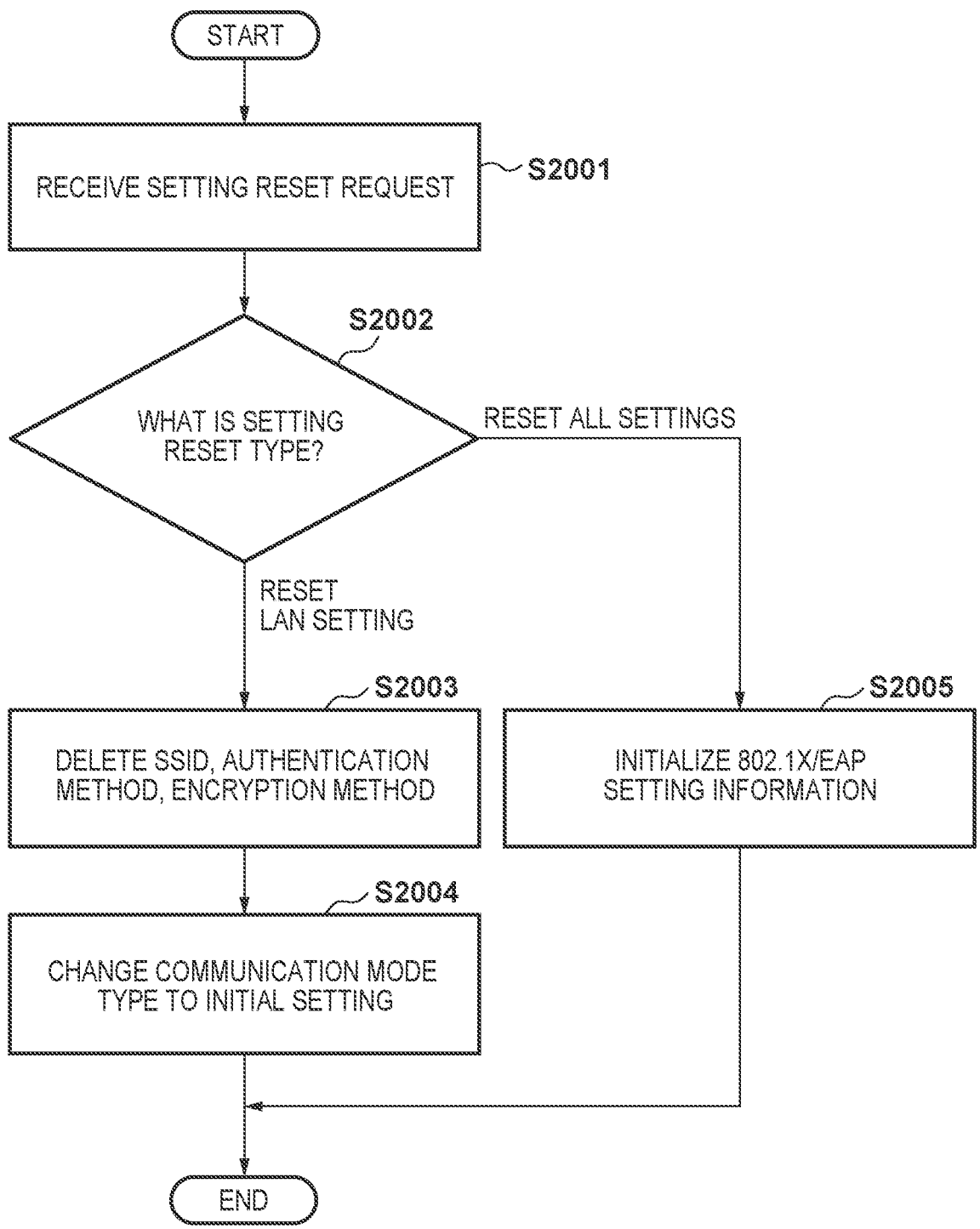
FIG. 20 is a flowchart for explaining processing in a time setting of the MFP.

FIG. 20 is a flowchart illustrating the operation of the MFP 300 when setting reset is requested. This flowchart is executed when the "reset only LAN setting" i1911 or the "reset all" i1912 is selected in the screen i1910 shown in FIG. 19B. If setting reset is requested, the MFP 300 initializes the setting value in accordance with the type of setting reset.

In step S2001, in response to reception of a notification for requesting setting reset, the MFP 300 advances the process to step S2002.

In step S2002, the MFP 300 determines the type of setting reset. If the "reset only LAN setting" i1911 is selected in the screen i1910 shown in FIG. 19B, LAN setting reset is determined, and the process advances to step S2004. If the "reset all" i1912 is selected in the screen i1910 shown in FIG. 19B, all setting reset is determined and the process advances to step S2005.

The MFP 300 deletes the recorded SSID, authentication method, encryption method, and the like in step S2003, and changes the type of the communication mode to the initial setting in step S2004.

In step S2005, the MFP 300 initializes the recorded IEEE802.1X/EAP setting information.

(Change of Time Setting)

Figure 21:
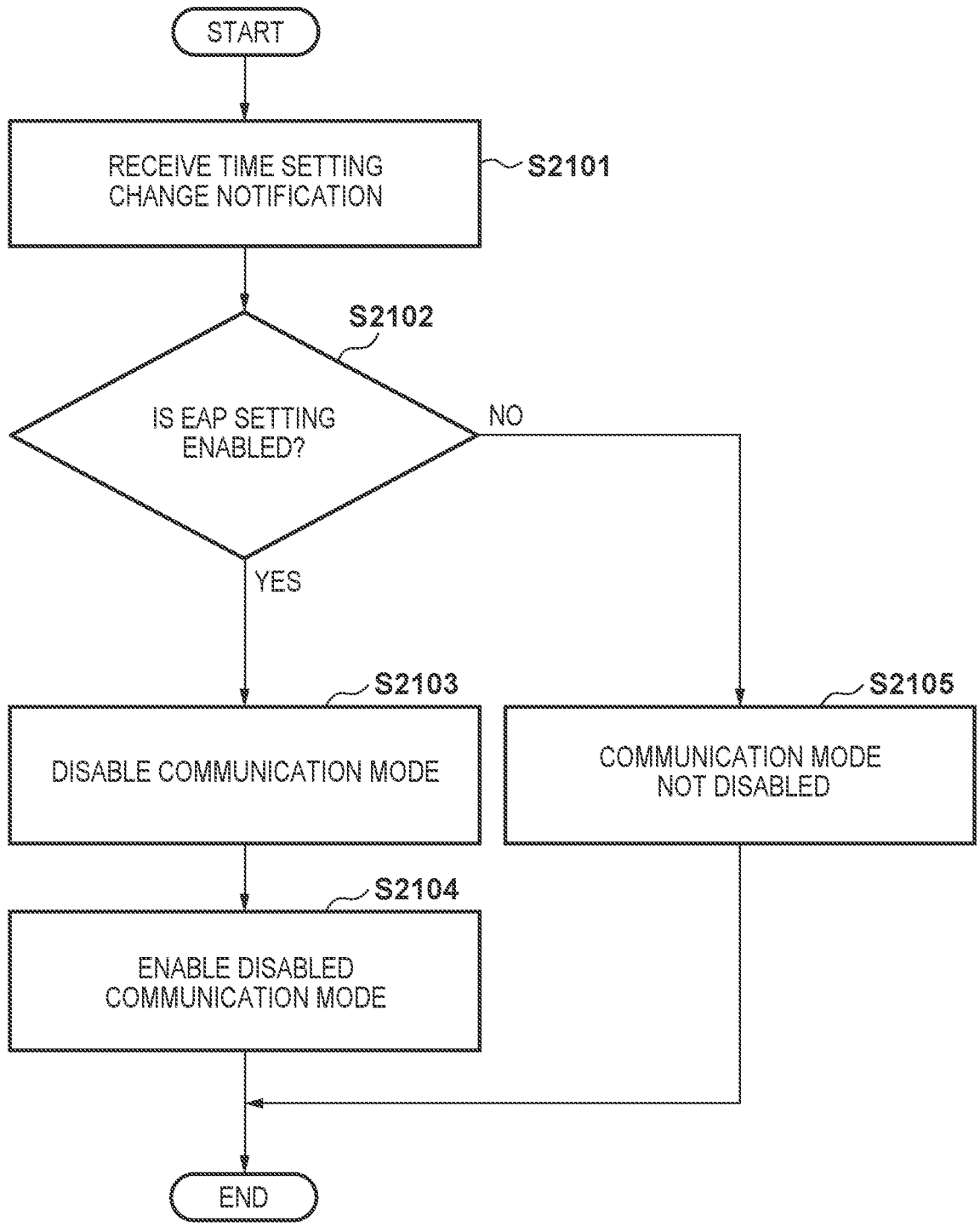
FIG. 21 is a flowchart illustrating the operation of the MFP when changing the time setting.

FIG. 21 is a flowchart illustrating the operation of the MFP 300 when changing the time setting. This flowchart is executed when the time is input to the field i1922 in the screen i1920 shown in FIG. 19C.

When performing IEEE802.1X/EAP authentication, the MFP 300 may verify, using the time set in the MFP 300, the valid period of a certificate to be used for authentication. To do this, if the time setting of the MFP 300 is changed, it is necessary to reflect the changed time on the communication control unit 318 and the wireless communication unit 307. If the communication control unit 318 and the wireless communication unit 307 need to be reactivated to reflect the time, the communication mode is reactivated by using, as a trigger, the change of the time setting of the MFP 300. However, if the communication mode is reactivated, communication is temporarily disconnected and it takes time to enable communication again. It is preferable to reactivate the communication mode only if it needs to be reactivated.

In step S2101, in response to reception of a notification indicating the change of the time setting, the MFP 300 advances the process to step S2102.

In step S2102, the MFP 300 determines whether the IEEE802.1X/EAP setting is enabled. If the setting is enabled, the process advances to step S2103; otherwise, the process advances to step S2105 and this flowchart ends without disabling the communication mode.

The MFP 300 disables the enabled communication mode in step S2103, and enables the communication mode again in step S2104. In this way, if the user sets the time setting, it is possible to dynamically switch the communication mode only if the communication mode needs to be reactivated.

The name of each of the elements and functional units described in the above embodiment is expressed based on the main function in this specification but may be expressed based on the sub-function. Therefore, the present invention is not strictly limited to this (this expression can be replaced by a similar expression). To the same effect, a term "unit" may be replaced by "component or piece", "member", "structure", "assembly", "circuit or module", "means", or the like, or may be omitted.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-141651, filed on Aug. 31, 2021, which is hereby incorporated by reference herein in its entirety.

What is claimed is:

1. A communication apparatus, which can communicate with an information apparatus, comprising:
an establishment unit configured to establish a first connection, the first connection being a connection between the communication apparatus and the information apparatus without intervention of an access point outside of the communication apparatus and outside of the information apparatus;
a first accepting unit configured to accept a first operation which is an operation for a second connection, the second connection being a connection between the communication apparatus and the access point which corresponds to a predetermined authentication method using an authentication server;
a second accepting unit configured to accept a second operation which is an operation for a third connection, the third connection being a connection between the communication apparatus and the access point which does not correspond to the predetermined authentication method; and
a first control unit configured to control
such that the second connection, among the first connection and the second connection, is maintained based on that the first operation is accepted while the first connection is established, and
such that the first connection and the third connection are maintained in parallel based on that the second operation is accepted while the first connection is established.

2. The communication apparatus according to claim 1, wherein
the first connection is disconnected based on that the first operation is accepted while the first connection is established,
the second connection is established after the first connection is disconnected, and
the disconnection of the first connection is maintained after the second connection is established.

3. The communication apparatus according to claim 1, wherein the first operation includes an operation for selecting the access point which corresponds to the predetermined authentication method, as a connecting object of the communication apparatus, and the second operation includes an operation for selecting the access point which does not correspond to the predetermined authentication method, as the connecting object.

4. The communication apparatus according to claim 1, wherein the first operation includes an operation for causing the communication apparatus to search the access point which corresponds to the predetermined authentication method, the second operation includes an operation for causing the communication apparatus to search the access point which does not correspond to the predetermined authentication method, in a case where the operation for causing the communication apparatus to search the access point which corresponds to the predetermined authentication method is input, the access point which corresponds to the predetermined authentication method is searched by the communication apparatus, in a case where the operation for causing the communication apparatus to search the access point which does not correspond to the predetermined authentication method is input, the access point which does not correspond to the predetermined authentication method is searched by the communication apparatus, and the operation for causing the communication apparatus to search the access point which corresponds to the predetermined authentication method and the operation for causing the communication apparatus to search the access point which does not correspond to the predetermined authentication method are different from each other.

5. The communication apparatus according to claim 1, further comprising:

a third accepting unit configured to accept a third operation which is an operation for establishing the first connection; and a second control unit configured to control
such that the first connection, among the first connection and the second connection, is maintained based on that the third operation is accepted while the second connection is established, and
such that the first connection and the third connection is maintained in parallel based on that the third operation is accepted while the third connection is established.

6. The communication apparatus according to claim 5, wherein the second connection is disconnected based on that the third operation is accepted while the second connection is established, the first connection is established after the second connection is disconnected, and the disconnection of the second connection is maintained after the first connection is established.

7. The communication apparatus according to claim 1, further comprising:

a fourth accepting unit configured to accept a request to enable or disable a setting related to the predetermined authentication method.

8. The communication apparatus according to claim 7, further comprising:

a third control unit configured to control, while the setting related to the predetermined authentication method is disable, so as not to perform a processing for establishing the second connection even if the first operation is accepted.

9. The communication apparatus according to claim 7, further comprising:

a first setting unit configured to set a mode of the communication apparatus, wherein in a case where an operation for enabling the setting related to the predetermined authentication method is accepted while the communication apparatus is in a mode for the third connection, the first setting unit sets the communication apparatus into a mode for the second connection after disabling the mode for the third connection.

10. The communication apparatus according to claim 7, further comprising:

a second setting unit configured to set a mode of the communication apparatus, wherein in a case where an operation for disabling the setting related to the predetermined authentication method is accepted while the communication apparatus is in a mode for the second connection, the second setting unit sets the communication apparatus into a mode for the third connection after disabling the mode for the second connection.

11. The communication apparatus according to claim 1, wherein the predetermined authentication method complies with IEEE802.1X/EAP (Extensible Authentication Protocol).

12. The communication apparatus according to claim 1, wherein the predetermined authentication method complies with one of EAP-TLS (EAP-Transport Layer Security), EAP-TTLS (EAP-Tunneled TLS) and EAP (Protected EAP).

13. The communication apparatus according to claim 1, wherein the access point which does not correspond to the predetermined authentication method is an access point which corresponds to another authentication method different from the predetermined authentication method.

14. The communication apparatus according to claim 13, wherein the other authentication method different from the predetermined authentication method is without using an authentication server.

15. The communication apparatus according to claim 1, further comprising:

a printing unit configured to perform printing.

16. The communication apparatus according to claim 1, further comprising:

a scanning unit configured to perform scanning.

17. The communication apparatus according to claim 1, wherein the first connect is a Wireless Direct communication.

18. The communication apparatus according to claim 1, wherein the authentication server is a Radius server.

19. A method of a communication apparatus, which can communicate with an information apparatus, comprising:

establishing a first connection, the first connection being a connection between the communication apparatus and the information apparatus without intervention of an access point outside of the communication apparatus and outside of the information apparatus;

accepting a first operation which is an operation for a second connection, the second connection being a connection between the communication apparatus and the access point which corresponds to a predetermined authentication method using an authentication server;

accepting a second operation which is an operation for a third connection, the third connection being a connection between the communication apparatus and the access point which does not correspond to the predetermined authentication method; and controlling such that the second connection, among the first connection and the second connection, is maintained based on that the first operation is accepted while the first connection is established, and such that the first connection and the third connection is maintained in parallel based on that the second operation is accepted while the first connection is established.

20. A computer-readable storage medium storing a program, the program configured to cause a computer of a communication apparatus which can communicate with an information apparatus, to perform:

establishing a first connection, the first connection being a connection between the communication apparatus and the information apparatus without intervention of an access point outside of the communication apparatus and outside of the information apparatus;

accepting a first operation which is an operation for a second connection, the second connection being a connection between the communication apparatus and the access point which corresponds to a predetermined authentication method using an authentication server;

accepting a second operation which is an operation for a third connection, the third connection being a connection between the communication apparatus and the access point which does not correspond to the predetermined authentication method; and controlling such that the second connection, among the first connection and the second connection, is maintained based on that the first operation is accepted while the first connection is established, and such that the first connection and the third connection is maintained in parallel based on that the second operation is accepted while the first connection is established.

* * * * *